United States Patent
Isaacson

(10) Patent No.: US 9,223,773 B2
(45) Date of Patent: Dec. 29, 2015

(54) TEMPLATE SYSTEM FOR CUSTOM DOCUMENT GENERATION

(71) Applicant: Palantir Technologies, Inc., Palo Alto, CA (US)

(72) Inventor: Andy Isaacson, Palo Alto, CA (US)

(73) Assignee: Palatir Technologies Inc., Palo Alto, CA (US)

( * ) Notice: Subject to any disclaimer, the term of this patent is extended or adjusted under 35 U.S.C. 154(b) by 0 days.

(21) Appl. No.: 14/148,568

(22) Filed: Jan. 6, 2014

(65) Prior Publication Data

US 2015/0046791 A1 Feb. 12, 2015

Related U.S. Application Data

(60) Provisional application No. 61/909,949, filed on Nov. 27, 2013, provisional application No. 61/863,792, filed on Aug. 8, 2013, provisional application No. 61/863,814, filed on Aug. 8, 2013.

(51) Int. Cl.
  *G06F 17/00* (2006.01)
  *G06F 17/24* (2006.01)
  *G06F 17/27* (2006.01)
  *G06F 17/22* (2006.01)

(52) U.S. Cl.
  CPC .......... *G06F 17/248* (2013.01); *G06F 17/2247* (2013.01); *G06F 17/243* (2013.01); *G06F 17/2705* (2013.01)

(58) Field of Classification Search
  CPC . G06F 17/243; G06F 17/248; G06F 17/2247; G06F 17/2705

USPC .......................................... 715/221–226, 235
See application file for complete search history.

(56) References Cited

U.S. PATENT DOCUMENTS

| | | | |
|---|---|---|---|
| 5,109,399 A | 4/1992 | Thompson | |
| 5,329,108 A | 7/1994 | Lamoure | |
| 5,632,009 A | 5/1997 | Rao et al. | |
| 5,670,987 A | 9/1997 | Doi et al. | |
| 5,781,704 A | 7/1998 | Rossmo | |
| 5,798,769 A | 8/1998 | Chiu et al. | |

(Continued)

FOREIGN PATENT DOCUMENTS

| | | |
|---|---|---|
| CA | 2666364 | 1/2015 |
| DE | 102014103482 | 9/2014 |

(Continued)

OTHER PUBLICATIONS

"A First Look: Predicting Market Demand for Food Retail using a Huff Analysis," TRF Policy Solutions, Jul. 2012, pp. 30.

(Continued)

*Primary Examiner* — Chau Nguyen
(74) *Attorney, Agent, or Firm* — Knobbe, Martens, Olson & Bear, LLP

(57) ABSTRACT

Systems and techniques for flexibly generating custom documents from data objects are described herein. Templates with embedded code instructions, which may be evaluated separate from a document reading or editing program, may be used to generate custom documents. The template system may use the embedded code instructions to dynamically access properties of data objects. An editing program may be used initially to generate a mockup document that may be used as the basis for a template.

20 Claims, 11 Drawing Sheets

(56) References Cited

U.S. PATENT DOCUMENTS

| | | |
|---|---|---|
| 5,845,300 A | 12/1998 | Comer |
| 6,057,757 A | 5/2000 | Arrowsmith et al. |
| 6,091,956 A | 7/2000 | Hollenberg |
| 6,161,098 A | 12/2000 | Wallman |
| 6,219,053 B1 | 4/2001 | Tachibana et al. |
| 6,232,971 B1 | 5/2001 | Haynes |
| 6,247,019 B1 | 6/2001 | Davies |
| 6,279,018 B1 | 8/2001 | Kudrolli et al. |
| 6,289,338 B1 | 9/2001 | Stoffel et al. |
| 6,341,310 B1 | 1/2002 | Leshem et al. |
| 6,366,933 B1 | 4/2002 | Ball et al. |
| 6,369,835 B1 | 4/2002 | Lin |
| 6,456,997 B1 | 9/2002 | Shukla |
| 6,463,404 B1 | 10/2002 | Appleby |
| 6,523,172 B1 | 2/2003 | Martinez-Guerra et al. |
| 6,539,538 B1 | 3/2003 | Brewster et al. |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,640,231 B1 | 10/2003 | Andersen et al. |
| 6,642,945 B1 | 11/2003 | Sharpe |
| 6,714,936 B1 | 3/2004 | Nevin, III |
| 6,748,481 B1 | 6/2004 | Parry et al. |
| 6,775,675 B1 | 8/2004 | Nwabueze et al. |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,980,984 B1 | 12/2005 | Huffman et al. |
| 6,985,950 B1 | 1/2006 | Hanson et al. |
| 7,027,974 B1 | 4/2006 | Busch et al. |
| 7,036,085 B2 | 4/2006 | Barros |
| 7,043,702 B2 | 5/2006 | Chi et al. |
| 7,055,110 B2 | 5/2006 | Kupka et al. |
| 7,089,541 B2 | 8/2006 | Ungar |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witkowski et al. |
| 7,237,192 B1 | 6/2007 | Stephenson et al. |
| 7,240,330 B2 | 7/2007 | Fairweather |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Caballero et al. |
| 7,426,654 B2 | 9/2008 | Adams et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,533,069 B2 | 5/2009 | Fairweather |
| 7,558,677 B2 | 7/2009 | Jones |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,685,083 B2 | 3/2010 | Fairweather |
| 7,703,021 B1 | 4/2010 | Flam |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,770,100 B2 | 8/2010 | Chamberlain et al. |
| 7,805,457 B1 | 9/2010 | Viola et al. |
| 7,809,703 B2 | 10/2010 | Balabhadrapatruni et al. |
| 7,818,658 B2 | 10/2010 | Chen |
| 7,877,421 B2 | 1/2011 | Berger et al. |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 * | 9/2011 | Roy et al. ..................... 715/255 |
| 8,024,778 B2 | 9/2011 | Cash et al. |
| 8,036,632 B1 | 10/2011 | Cona et al. |
| 8,103,543 B1 | 1/2012 | Zwicky |
| 8,117,022 B2 | 2/2012 | Linker |
| 8,132,149 B2 | 3/2012 | Shenfield et al. |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,947 B2 | 7/2012 | Fujinaga |
| 8,230,333 B2 | 7/2012 | Decherd et al. |
| 8,271,948 B2 | 9/2012 | Talozi et al. |
| 8,280,880 B1 | 10/2012 | Aymeloglu et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,312,367 B2 | 11/2012 | Foster |
| 8,312,546 B2 | 11/2012 | Alme |
| 8,352,881 B2 | 1/2013 | Champion et al. |
| 8,368,695 B2 | 2/2013 | Howell et al. |
| 8,397,171 B2 | 3/2013 | Klassen et al. |
| 8,412,707 B1 | 4/2013 | Mianji |
| 8,447,722 B1 | 5/2013 | Ahuja et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,623 B2 | 7/2013 | Jain et al. |
| 8,489,641 B1 | 7/2013 | Seefeld et al. |
| 8,498,984 B1 | 7/2013 | Hwang et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,709 B2 | 10/2013 | Goodson et al. |
| 8,560,494 B1 | 10/2013 | Downing et al. |
| 8,577,911 B1 | 11/2013 | Stepinski et al. |
| 8,589,273 B2 | 11/2013 | Creeden et al. |
| 8,620,641 B2 | 12/2013 | Farnsworth et al. |
| 8,646,080 B2 | 2/2014 | Williamson et al. |
| 8,676,857 B1 | 3/2014 | Adams et al. |
| 8,689,108 B1 | 4/2014 | Duffield et al. |
| 8,689,182 B2 | 4/2014 | Leithead et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,799,799 B1 | 8/2014 | Cervelli et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,903,717 B2 | 12/2014 | Elliot |
| 8,917,274 B2 | 12/2014 | Ma et al. |
| 8,924,872 B1 | 12/2014 | Bogomolov et al. |

(56) References Cited

U.S. PATENT DOCUMENTS

| | | |
|---|---|---|
| 8,930,897 B2 | 1/2015 | Nassar |
| 8,937,619 B2 | 1/2015 | Sharma et al. |
| 8,938,686 B1 | 1/2015 | Erenrich et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095658 A1 | 7/2002 | Shulman |
| 2002/0116120 A1 | 8/2002 | Ruiz et al. |
| 2002/0130907 A1 | 9/2002 | Chi et al. |
| 2002/0174201 A1 | 11/2002 | Ramer et al. |
| 2003/0028560 A1 | 2/2003 | Kudrolli et al. |
| 2003/0039948 A1 | 2/2003 | Donahue |
| 2003/0144868 A1 | 7/2003 | MacIntyre et al. |
| 2003/0163352 A1 | 8/2003 | Surpin et al. |
| 2003/0172053 A1 | 9/2003 | Fairweather |
| 2003/0177112 A1 | 9/2003 | Gardner |
| 2003/0200217 A1* | 10/2003 | Ackerman ........................ 707/9 |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0044992 A1 | 3/2004 | Muller et al. |
| 2004/0064256 A1 | 4/2004 | Barinek et al. |
| 2004/0083466 A1 | 4/2004 | Dapp et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0126840 A1 | 7/2004 | Cheng et al. |
| 2004/0143602 A1 | 7/2004 | Ruiz et al. |
| 2004/0163039 A1 | 8/2004 | Gorman |
| 2004/0181554 A1 | 9/2004 | Heckerman et al. |
| 2004/0193600 A1 | 9/2004 | Kaasten et al. |
| 2004/0221223 A1 | 11/2004 | Yu et al. |
| 2004/0260702 A1 | 12/2004 | Cragun et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0080769 A1 | 4/2005 | Gemmell |
| 2005/0086207 A1 | 4/2005 | Heuer et al. |
| 2005/0091420 A1 | 4/2005 | Snover et al. |
| 2005/0125715 A1 | 6/2005 | Franco et al. |
| 2005/0162523 A1 | 7/2005 | Darrell et al. |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0059139 A1 | 3/2006 | Robinson |
| 2006/0074881 A1 | 4/2006 | Vembu et al. |
| 2006/0080619 A1 | 4/2006 | Carlson et al. |
| 2006/0129746 A1 | 6/2006 | Porter |
| 2006/0139375 A1 | 6/2006 | Rasmussen et al. |
| 2006/0142949 A1 | 6/2006 | Helt |
| 2006/0143556 A1 | 6/2006 | Elkady |
| 2006/0149596 A1 | 7/2006 | Surpin et al. |
| 2006/0203337 A1 | 9/2006 | White |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0038962 A1 | 2/2007 | Fuchs et al. |
| 2007/0057966 A1 | 3/2007 | Ohno et al. |
| 2007/0074169 A1 | 3/2007 | Chess et al. |
| 2007/0078832 A1 | 4/2007 | Ott et al. |
| 2007/0078872 A1 | 4/2007 | Cohen |
| 2007/0083541 A1 | 4/2007 | Fraleigh et al. |
| 2007/0112714 A1 | 5/2007 | Fairweather |
| 2007/0174760 A1 | 7/2007 | Chamberlain et al. |
| 2007/0192265 A1 | 8/2007 | Chopin et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1* | 10/2007 | Abnous et al. .... G06F 17/30607 1/1 |
| 2007/0240062 A1 | 10/2007 | Christena et al. |
| 2007/0266336 A1 | 11/2007 | Nojima et al. |
| 2007/0294643 A1 | 12/2007 | Kyle |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0104019 A1 | 5/2008 | Nath |
| 2008/0126951 A1 | 5/2008 | Sood et al. |
| 2008/0140387 A1 | 6/2008 | Linker |
| 2008/0155440 A1 | 6/2008 | Trevor et al. |
| 2008/0162616 A1 | 7/2008 | Gross et al. |
| 2008/0195417 A1 | 8/2008 | Surpin et al. |
| 2008/0195608 A1 | 8/2008 | Clover |
| 2008/0222295 A1 | 9/2008 | Robinson et al. |
| 2008/0228467 A1 | 9/2008 | Womack et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0281580 A1 | 11/2008 | Zabokritski |
| 2008/0288306 A1 | 11/2008 | MacIntyre et al. |
| 2008/0301643 A1 | 12/2008 | Appleton et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0055251 A1 | 2/2009 | Shah et al. |
| 2009/0076845 A1 | 3/2009 | Bellin et al. |
| 2009/0088964 A1 | 4/2009 | Schaaf et al. |
| 2009/0119309 A1 | 5/2009 | Gibson et al. |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0144262 A1 | 6/2009 | White et al. |
| 2009/0144274 A1 | 6/2009 | Fraleigh et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0177962 A1* | 7/2009 | Gusmorino et al. .......... 715/243 |
| 2009/0179892 A1 | 7/2009 | Tsuda et al. |
| 2009/0222400 A1 | 9/2009 | Kupershmidt et al. |
| 2009/0222760 A1 | 9/2009 | Halverson et al. |
| 2009/0234720 A1 | 9/2009 | George et al. |
| 2009/0249244 A1 | 10/2009 | Robinson et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2010/0011282 A1 | 1/2010 | Dollard et al. |
| 2010/0042922 A1 | 2/2010 | Bradateanu et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070897 A1 | 3/2010 | Aymeloglu et al. |
| 2010/0100963 A1 | 4/2010 | Mahaffey |
| 2010/0103124 A1 | 4/2010 | Kruzeniski et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0204983 A1 | 8/2010 | Chung et al. |
| 2010/0228812 A1 | 9/2010 | Uomini |
| 2010/0250412 A1 | 9/2010 | Wagner |
| 2010/0280857 A1 | 11/2010 | Liu et al. |
| 2010/0293174 A1 | 11/2010 | Bennett et al. |
| 2010/0306285 A1 | 12/2010 | Shah et al. |

(56) References Cited

U.S. PATENT DOCUMENTS

| | | |
|---|---|---|
| 2010/0306713 A1 | 12/2010 | Geisner et al. |
| 2010/0313119 A1* | 12/2010 | Baldwin et al. ............... 715/256 |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0047159 A1* | 2/2011 | Baid et al. ..................... 707/738 |
| 2011/0060753 A1 | 3/2011 | Shaked et al. |
| 2011/0061013 A1 | 3/2011 | Bilicki et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0185316 A1 | 7/2011 | Reid et al. |
| 2011/0208724 A1 | 8/2011 | Jones et al. |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0258158 A1 | 10/2011 | Resende et al. |
| 2011/0258216 A1 | 10/2011 | Supakkul et al. |
| 2011/0270705 A1 | 11/2011 | Parker |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0019559 A1 | 1/2012 | Siler et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0137235 A1* | 5/2012 | T S et al. ................... G06F 8/38 715/763 |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0173985 A1 | 7/2012 | Peppel |
| 2012/0191446 A1 | 7/2012 | Binsztok et al. |
| 2012/0196557 A1 | 8/2012 | Reich et al. |
| 2012/0196558 A1 | 8/2012 | Reich et al. |
| 2012/0208636 A1 | 8/2012 | Feige |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0290879 A1 | 11/2012 | Shibuya et al. |
| 2012/0296907 A1 | 11/2012 | Long et al. |
| 2012/0304150 A1 | 11/2012 | Leithead et al. |
| 2012/0323888 A1 | 12/2012 | Osann, Jr. |
| 2012/0330973 A1 | 12/2012 | Ghuneim et al. |
| 2013/0006725 A1 | 1/2013 | Simanek et al. |
| 2013/0046842 A1 | 2/2013 | Muntz et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0091084 A1 | 4/2013 | Lee |
| 2013/0097482 A1 | 4/2013 | Marantz et al. |
| 2013/0111320 A1 | 5/2013 | Campbell et al. |
| 2013/0117651 A1 | 5/2013 | Waldman et al. |
| 2013/0124193 A1 | 5/2013 | Holmberg |
| 2013/0101159 A1 | 6/2013 | Rosen |
| 2013/0150004 A1 | 6/2013 | Rosen |
| 2013/0151148 A1 | 6/2013 | Parundekar et al. |
| 2013/0157234 A1 | 6/2013 | Gulli et al. |
| 2013/0176321 A1 | 7/2013 | Mitchell et al. |
| 2013/0179420 A1 | 7/2013 | Park et al. |
| 2013/0224696 A1 | 8/2013 | Wolfe et al. |
| 2013/0226953 A1 | 8/2013 | Markovich et al. |
| 2013/0238616 A1 | 9/2013 | Rose et al. |
| 2013/0246170 A1 | 9/2013 | Gross et al. |
| 2013/0251233 A1* | 9/2013 | Yang et al. ..................... 382/132 |
| 2013/0262527 A1 | 10/2013 | Hunter et al. |
| 2013/0263019 A1 | 10/2013 | Castellanos et al. |
| 2013/0268520 A1 | 10/2013 | Fisher et al. |
| 2013/0275446 A1 | 10/2013 | Jain et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2013/0311375 A1 | 11/2013 | Priebatsch |
| 2014/0019936 A1* | 1/2014 | Cohanoff ....................... 717/115 |
| 2014/0032506 A1 | 1/2014 | Hoey et al. |
| 2014/0033010 A1* | 1/2014 | Richardt et al. ............... 715/222 |
| 2014/0040371 A1 | 2/2014 | Gurevich et al. |
| 2014/0047319 A1* | 2/2014 | Eberlein ............. G06F 17/2247 715/234 |
| 2014/0047357 A1 | 2/2014 | Alfaro et al. |
| 2014/0059038 A1 | 2/2014 | McPherson et al. |
| 2014/0068487 A1 | 3/2014 | Steiger et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0267294 A1 | 9/2014 | Ma |
| 2014/0267295 A1 | 9/2014 | Sharma |
| 2014/0279824 A1 | 9/2014 | Tamayo |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2015/0019394 A1 | 1/2015 | Unser et al. |
| 2015/0046481 A1 | 2/2015 | Elliot |
| 2015/0046870 A1 | 2/2015 | Goldenberg et al. |
| 2015/0089424 A1 | 3/2015 | Duffield et al. |
| 2015/0100559 A1 | 4/2015 | Nassar |
| 2015/0100897 A1 | 4/2015 | Sun et al. |
| 2015/0100907 A1 | 4/2015 | Erenrich et al. |

FOREIGN PATENT DOCUMENTS

| | | |
|---|---|---|
| DE | 102014204840 | 9/2014 |
| DE | 102014215621 | 2/2015 |
| EP | 1672527 | 6/2006 |
| EP | 2551799 | 1/2013 |
| EP | 2778913 | 9/2014 |
| EP | 2778914 | 9/2014 |
| EP | 2778977 | 9/2014 |
| EP | 2778986 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| GB | 2366498 | 3/2002 |
| GB | 2513007 | 10/2014 |
| GB | 2516155 | 1/2015 |
| GB | 2518745 | 4/2015 |

(56) References Cited

FOREIGN PATENT DOCUMENTS

| | | |
|---|---|---|
| NL | 2012778 | 11/2014 |
| NZ | 624557 | 12/2014 |
| WO | WO 00/09529 | 2/2000 |
| WO | WO 03/060751 | 7/2003 |
| WO | WO 2005/104736 | 11/2005 |
| WO | WO 2008/064207 | 5/2008 |
| WO | WO 2009/061501 | 5/2009 |
| WO | WO 2010/000014 | 1/2010 |
| WO | WO 2010/030913 | 3/2010 |
| WO | WO 2011/071833 | 6/2011 |
| WO | WO 2013/010157 | 1/2013 |
| WO | WO 2013/102892 | 7/2013 |

OTHER PUBLICATIONS

Acklen, Laura, "Absolute Beginner's Guide to Microsoft Word 2003," Dec. 24, 2003, pp. 15-18, 34-41, 308-316.

Ananiev et al., "The New Modality API," http://web.archive.org/web/20061211011958/http://java.sun.com/developer/technicalArticles/J2SE/Desktop/javase6/modality/ Jan. 2006, pp. 8.

Anonymous, "BackTuIt—JD Edwards One World Version Control System," printed Jul. 23, 2007 in 1 page.

Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.

GIS-NET 3 Public—Department of Regional Planning. Planning & Zoning Information for Unincorporated LA County. Retrieved Oct. 2, 2013 from http://gis.planning.lacounty.gov/GIS-NET3_Public/Viewer.html.

Griffith, Daniel A., "A Generalized Huff Model," Geographical Analysis, Apr. 1982, vol. 14, No. 2, pp. 135-144.

Hibbert et al., "Prediction of Shopping Behavior Using a Huff Model Within a GIS Framework," Healthy Eating in Context Mar. 18, 2011, pp. 16.

Huff et al., "Calibrating the Huff Model Using ArcGIS Business Analyst," ESRI, Sep. 2008, pp. 33.

Huff, David L., "Parameter Estimation in the Huff Model," ESRI, ArcUser, Oct.-Dec. 2003, pp. 34-36.

International Search Report and Written Opinion in Application No. PCT/US07/085202, dated May 22, 2008.

International Search Report and Written Opinion in Application No. PCT/US2009/056703, dated Mar. 15, 2010.

Klemmer et al., "Where Do Web Sites Come From? Capturing and Interacting with Design History," Association for Computing Machinery, CHI 2002, Apr. 20-25, 2002, Minneapolis, MN, pp. 8.

Kokossi et al., "D7-Dynamic Ontoloty Management System (Design)," Information Societies Technology Programme, Jan. 10, 2002, pp. 1-27.

Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.

Manske, "File Saving Dialogs," http://www.mozilla.org/editor/ui_specs/FileSaveDialogs.html, Jan. 20, 1999, pp. 7.

Map of San Jose, CA. Retrieved Oct. 2, 2013 from http://maps.google.com.

Map of San Jose, CA. Retrieved Oct. 2, 2013 from http://maps.bing.com.

Map of San Jose, CA. Retrieved Oct. 2, 2013 from http://maps.yahoo.com.

Microsoft—Developer Network, "Getting Started with VBA in Word 2010," Apr. 2010, http://msdn.microsoft.com/en-us/library/ff604039%28v=office.14%29.aspx as printed Apr. 4, 2014 in 17 pages.

Microsoft Office—Visio, "About connecting shapes," http://office.microsoft.com/en-us/visio-help/about-connecting-shapes-HP085050369.aspx printed Aug. 4, 2011 in 6 pages.

Microsoft Office—Visio, "Add and glue connectors with the Connector tool," http://office.microsoft.com/en-us/visio-help/add-and-glue-connectors-with-the-connector-tool-HA010048532.aspx?CTT=1 printed Aug. 4, 2011 in 1 page.

Miklau et al., "Securing History: Privacy and Accountability in Database Systems," 3rd Biennial Conference on Innovative Data Systems Research (CIDR), Jan. 7-10, 2007, Asilomar, California, pp. 387-396.

Niepert et al., "A Dynamic Ontology for a Dynamic Reference Work", Joint Conference on Digital Libraries, Jun. 17-22, 2007, Vancouver, British Columbia, Canada, pp. 1-10.

Palantir, "Extracting and Transforming Data with Kite," Palantir Technologies, Inc., Copyright 2010, pp. 38.

Palantir, "Kite," https://docs.palantir.com/gotham/3.11.1.0/adminreference/datasources.11 printed Aug. 30, 2013 in 2 pages.

Palantir, "Kite Data-Integration Process Overview," Palantir Technologies, Inc., Copyright 2010, pp. 48.

Palantir, "Kite Operations," Palantir Technologies, Inc., Copyright 2010, p. 1.

Palantir, "The Repository Element," https://docs.palantir.com/gotham/3.11.1.0/dataguide/kite_config_file.04 printed Aug. 30, 2013 in 2 pages.

Palantir, "Write a Kite Configuration File in Eclipse," Palantir Technologies, Inc., Copyright 2010, pp. 2.

Palantir, https://docs.palantir.com/gotham/3.11.1.0/dataguide/baggage/KiteSchema.xsd printed Apr. 4, 2014 in 4 pages.

Wollrath et al., "A Distributed Object Model for the Java System," Conference on Object-Oriented Technologies and Systems, Jun. 17-21, 1996, pp. 219-231.

Official Communication for Australian Patent Application No. 2014208218 dated May 28, 2015.

International Search Report in Dutch Application No. 2013306, mailed Apr. 24, 2015.

"A Quick Guide to UniProtKB Swiss-Prot & TrEMBL," Sep. 2011, pp. 2.

"A Tour of Pinboard," http://pinboard.in/tour as printed May 15, 2014 in 6 pages.

Bluttman et al., "Excel Formulas and Functions for Dummies," 2005, Wiley Publishing, Inc., pp. 280, 284-286.

Boyce, Jim, "Microsoft Outlook 2010 Inside Out," Aug. 1, 2010, retrieved from the internet https://capdtron.files.wordpress.com/2013/01/outlook-2010-inside_out.pdf.

Canese et al., "Chapter 2: PubMed: The Bibliographic Database," The NCBI Handbook, Oct. 2002, pp. 1-10.

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.

Conner, Nancy, "Google Apps: The Missing Manual," May 1, 2008, pp. 15.

Definition "Identify" downloaded Jan. 22, 2015, 1 page.

Definition "Overlay" downloaded Jan. 22, 2015, 1 page.

Delcher et al., "Identifying Bacterial Genes and Endosymbiont DNA with Glimmer," BioInformatics, vol. 23, No. 6, 2007, pp. 673-679.

Delicious, http://delicious.com/ as printed May 15, 2014 in 1 page.

Geiger, Jonathan G., "Data Quality Management, The Most Critical Initiative You Can Implement," Data Warehousing, Management and Quality, Paper 098-29, SUGI 29, Intelligent Solutions, Inc., Bounder, CO, pp. 14, accessed Oct. 3, 2013.

Goswami, Gautam, "Quite Writly Said!," One Brick at a Time, Aug. 21, 2005, pp. 7.

Hansen et al. "Analyzing Social Media Networks with NodeXL: Insights from a Connected World", Chapter 4, pp. 53-67 and Chapter 10, pp. 143-164, published Sep. 2010.

(56) References Cited

OTHER PUBLICATIONS

Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.

Hogue et al., "Thresher: Automating the Unwrapping of Semantic Content from the World Wide Web," 14th International Conference on World Wide Web, WWW 2005: Chiba, Japan, May 10-14, 2005, pp. 86-95.

Johnson, Maggie, "Introduction to YACC and Bison", Handout 13, Jul. 8, 2005, pp. 11.

Kahan et al., "Annotea: an open RDF infrastructure for shared WEB annotations", Computer Networks 39, pp. 589-608, 2002.

Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.

Keylines.com, "KeyLines Datasheet," Mar. 2014, http://keylines.com/wp-content/uploads/2014/03/KeyLines-datasheet.pdf downloaded May 12, 2014 in 2 pages.

Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.

Kitts, Paul, "Chapter 14: Genome Assembly and Annotation Process," The NCBI Handbook, Oct. 2002, pp. 1-21.

Li et al., "Interactive Multimodal Visual Search on Mobile Device," IEEE Transactions on Multimedia, vol. 15, No. 3, Apr. 1, 2013, pp. 594-607.

Madden, Tom, "Chapter 16: The BLAST Sequence Analysis Tool," The NCBI Handbook, Oct. 2002, pp. 1-15.

Manno et al., "Introducing Collaboration in Single-user Applications through the Centralized Control Architecture," 2010, pp. 10.

Mizrachi, Ilene, "Chapter 1: GenBank: The Nuckeotide Sequence Database," The NCBI Handbook, Oct. 2002, pp. 1-14.

Morrison et al., "Converting Users to Testers: An Alternative Approach to Load Test Script Creation, Parameterization and Data Correlation," CCSC: Southeastern Conference, JCSC 28, 2, Dec. 2012, pp. 188-196.

Nierman, "Evaluating Structural Similarity in XML Documents," 2002, 6 pages.

Nivas, Tuli, "Test Harness and Script Design Principles for Automated Testing of non-GUI or Web Based Applications," Performance Lab, Jun. 2011, pp. 30-37.

Olanoff, Drew, "Deep Dive with the New Google Maps for Desktop with Google Earth Integration, It's More than Just a Utility," May 15, 2013, pp. 1-6, retrieved from the internet: http://web.archive.org.web/20130515230641/http://techcrunch.com/2013/05/15/deep-dive-with-the-new-google-maps-for-desktop-with-google-earth-integration-its-more-than-just-a-utility/.

Palermo, Christopher J., "Memorandum," [Disclosure relating to U.S. Appl. No. 13/916,447, filed Jun. 12, 2013, and related applications], Jan. 31, 2014 in 3 pages.

Palmas et al., "An Edge-Bunding Layout for Interactive Parallel Coordinates" 2014 IEEE Pacific Visualization Symposium, pp. 57-64.

Rouse, Margaret, "OLAP Cube," http://searchdatamanagement.techtarget.com/definition/OLAP-cube, Apr. 28, 2012, pp. 16.

Sigrist, et al., "PROSITE, a Protein Domain Database for Functional Characterization and Annotation," Nucleic Acids Research, 2010, vol. 38, pp. D161-D166.

Sirotkin et al., "Chapter 13: The Processing of Biological Sequence Data at NCBI," The NCBI Handbook, Oct. 2002, pp. 1-11.

"The FASTA Program Package," fasta-36.3.4, Mar. 25, 2011, pp. 29.

Umagandhi et al., "Search Query Recommendations Using Hybrid User Profile with Query Logs," International Journal of Computer Applications, vol. 80, No. 10, Oct. 1, 2013, pp. 7-18.

Wikipedia, "Federated Database System," Sep. 7, 2013, retrieved from the internet on Jan. 27, 2015 http://en.wikipedia.org/w/index.php?title=Federated_database_system&oldid=571954221.

Yang et al., "HTML Page Analysis Based on Visual Cues," 2001, pp. 859-864.

Notice of Allowance for U.S. Appl. No. 14/102,394 dated Aug. 25, 2014.

Notice of Allowance for U.S. Appl. No. 14/108,187 dated Aug. 29, 2014.

Notice of Allowance for U.S. Appl. No. 14/135,289 dated Oct. 14, 2014.

Notice of Allowance for U.S. Appl. No. 14/268,964 dated Dec. 3, 2014.

Notice of Allowance for U.S. Appl. No. 14/473,860 dated Jan. 5, 2015.

Notice of Allowance for U.S. Appl. No. 14/192,767 dated Dec. 16, 2014.

Notice of Allowance for U.S. Appl. No. 14/294,098 dated Dec. 29, 2014.

Notice of Allowance for U.S. Appl. No. 14/616,080 dated Apr. 2, 2015.

Notice of Allowance for U.S. Appl. No. 14/486,991 dated May 1, 2015.

Notice of Allowance for U.S. Appl. No. 14/225,084 dated May 4, 2015.

Notice of Allowance for U.S. Appl. No. 14/504,103 dated May 18, 2015.

Notice of Allowance for U.S. Appl. No. 14/044,800 dated Sep. 2, 2014.

Official Communication for New Zealand Patent Application No. 624557 dated May 14, 2014.

Official Communication for New Zealand Patent Application No. 628585 dated Aug. 26, 2014.

Official Communication for European Patent Application No. 14158861.6 dated Jun. 16, 2014.

Official Communication for New Zealand Patent Application No. 622517 dated Apr. 3, 2014.

Official Communication for New Zealand Patent Application No. 628263 dated Aug. 12, 2014.

Official Communication for Great Britain Patent Application No. 1404457.2 dated Aug. 14, 2014.

Official Communication for New Zealand Patent Application No. 627962 dated Aug. 5, 2014.

Official Communication for European Patent Application No. 14159464.8 dated Jul. 31, 2014.

Official Communication for New Zealand Patent Application No. 628840 dated Aug. 28, 2014.

Official Communication in New Zealand Patent Application No. 628495 dated Aug. 19, 2014.

Official Communication for Great Britain Patent Application No. 1408025.3 dated Nov. 6, 2014.

Official Communication for New Zealand Patent Application No. 622513 dated Apr. 3, 2014.

Official Communication for New Zealand Patent Application No. 628161 dated Aug. 25, 2014.

Official Communication for Great Britain Patent Application No. 1404574.4 dated Dec. 18, 2014.

Official Communication for Great Britain Patent Application No. 1411984.6 dated Dec. 22, 2014.

Official Communication for Great Britain Patent Application No. 1413935.6 dated Jan. 27, 2015.

Official Communication for European Patent Application No. 14180281.9 dated Jan. 26, 2015.

Official Communication for European Patent Application No. 14187996.5 dated Feb. 12, 2015.

Official Communication for European Patent Application No. 14180142.3 dated Feb. 6, 2015.

Official Communication for European Patent Application No. 14186225.0 dated Feb. 13, 2015.

Official Communication for European Patent Application No. 14189344.6 dated Feb. 20, 2015.

Official Communication for Australian Patent Application No. 2014201511 dated Feb. 27, 2015.

Official Communication for European Patent Application No. 14189347.9 dated Mar. 4, 2015.

(56) References Cited

OTHER PUBLICATIONS

Official Communication for European Patent Application No. 14199182.8 dated Mar. 13, 2015.
Official Communication for Australian Patent Application No. 2014202442 dated Mar. 19, 2015.
Official Communication for European Patent Application No. 14180321.3 dated Apr. 17, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14189802.3 dated May 11, 2015.
Official Communication for European Patent Application No. 14159629.6 dated Jul. 31, 2014.
Official Communication for New Zealand Patent Application No. 622389 dated Mar. 20, 2014.
Official Communication for New Zealand Patent Application No. 622404 dated Mar. 20, 2014.
Official Communication for European Patent Application No. 14158958.0 dated Jun. 3, 2014.
Official Communication for European Patent Application No. 14158977.0 dated Jun. 10, 2014.
Official Communication for New Zealand Patent Application No. 622414 dated Mar. 24, 2014.
Official Communication for New Zealand Patent Application No. 622484 dated Apr. 2, 2014.
Official Communication for Israel Patent Application No. 198253 dated Nov. 24, 2014.
Official Communication for Australian Patent Application No. 2014201506 dated Feb. 27, 2015.
Official Communication for Australian Patent Application No. 2014201507 dated Feb. 27, 2015.
Official Communication for Australian Patent Application No. 2014201580 dated Feb. 27, 2015.
Official Communication for European Patent Application No. 14158977.0 dated Apr. 16, 2015.
Official Communication for European Patent Application No. 14158958.0 dated Apr. 16, 2015.
Official Communication for U.S. Appl. No. 14/289,596 dated Jul. 18, 2014.
Official Communication for U.S. Appl. No. 14/289,599 dated Jul. 22, 2014.
Official Communication for U.S. Appl. No. 14/225,160 dated Jul. 29, 2014.
Official Communication for U.S. Appl. No. 14/268,964 dated Sep. 3, 2014.
Official Communication for U.S. Appl. No. 14/225,084 dated Sep. 2, 2014.
Official Communication for U.S. Appl. No. 14/294,098 dated Aug. 15, 2014.
Official Communication for U.S. Appl. No. 14/148,568 dated Oct. 22, 2014.
Official Communication for U.S. Appl. No. 14/225,006 dated Sep. 10, 2014.
Official Communication for U.S. Appl. No. 14/294,098 dated Nov. 6, 2014.
Official Communication for U.S. Appl. No. 14/306,138 dated Sep. 23, 2014.
Official Communication for U.S. Appl. No. 14/306,154 dated Sep. 9, 2014.
Official Communication for U.S. Appl. No. 14/306,147 dated Sep. 9, 2014.
Official Communication for U.S. Appl. No. 14/319,765 dated Nov. 25, 2014.
Official Communication for U.S. Appl. No. 14/323,935 dated Nov. 28, 2014.
Official Communication for U.S. Appl. No. 14/326,738 dated Dec. 2, 2014.
Official Communication for U.S. Appl. No. 14/225,160 dated Oct. 22, 2014.
Official Communication for U.S. Appl. No. 14/504,103 dated Feb. 5, 2015.
Official Communication for U.S. Appl. No. 14/289,596 dated Jan. 26, 2015.
Official Communication for U.S. Appl. No. 14/319,765 dated Feb. 4, 2015.
Official Communication for U.S. Appl. No. 14/225,160 dated Feb. 11, 2015.
Official Communication for U.S. Appl. No. 14/306,138 dated Feb. 18, 2015.
Official Communication for U.S. Appl. No. 14/306,147 dated Feb. 19. 2015.
Official Communication for U.S. Appl. No. 14/225,084 dated Feb. 20, 2015.
Official Communication for U.S. Appl. No. 14/225,006 dated Feb. 27, 2015.
Official Communication for U.S. Appl. No. 14/473,552 dated Feb. 24, 2015.
Official Communication for U.S. Appl. No. 14/486,991 dated Mar. 10, 2015.
Official Communication for U.S. Appl. No. 14/306,154 dated Mar. 11, 2015.
Official Communication for U.S. Appl. No. 13/831,791 dated Mar. 4, 2015.
Official Communication for U.S. Appl. No. 14/504,103 dated Mar. 31, 2015.
Official Communication for U.S. Appl. No. 14/323,935 dated Mar. 31, 2015.
Official Communication for U.S. Appl. No. 14/326,738 dated Mar. 31, 2015.
Official Communication for U.S. Appl. No. 13/247,987 dated Apr. 2, 2015.
Official Communication for U.S. Appl. No. 14/148,568 dated Mar. 26, 2015.
Official Communication for U.S. Appl. No. 14/508,696 dated Mar. 2, 2015.

\* cited by examiner

```
310A
       <document>
            ⋮
            <paragraph>
                 <text>NAME-HOLDER</text>
            </paragraph>
            <paragraph>
                 <image name="image-HOLDER.png" />
            </paragraph>
            <paragraph>
                 <table>
                      <row>
                           <tableData>Height</tableData>
                           <tableData>HEIGHT-HOLDER</tableData>
                      </row>
                      <row>
                           <tableData>Contact Information</tableData>
                           <tableData>CONTACT-HOLDER</tableData>
                      </row>
                      <row>
                           <tableData>Associates</tableData>
                           <tableData>ASSOCIATES-HOLDER</tableData>
                      </row>
                 </table>
            </paragraph>
            ⋮
       </document>
```

FIG. 3B

```
<document>
    ⋮

<% for each object in objects %>
        <paragraph>
                <text><%= print(object.getName) %></text>
        </paragraph>
        <paragraph>
                <image name="<%= print(object.getPicture) %>" />
        </paragraph>
        <paragraph>
                <table>
                        <row>
                                <tableData>Height</tableData>
                                <tableData>
<%
records = object.getRecords;
height = frequencyMap(records, "height").getMostCommon;
print(height);
%>
                                </tableData>
                        </row>
                        <row>
                                <tableData>Contact Information</tableData>
                                <tableData>
<%
if object.getPhoneNumber is not null
        println("Phone Number: " + object.getPhoneNumber);
if object.getEmail is not null
        println("Email: " + object.getEmail);
%>
                                </tableData>
                        </row>
                        <row>
                                <tableData>Associates</tableData>
                                <tableData><%= print(object.getAssociates.join(",")) %></tableData>
                        </row>
                </table>
        </paragraph>
<% end %>
    ⋮

</document>
```

Labels: 310B, 316, 312, 314

FIG. 3C

```
320
    <document>
322
            <paragraph>
                    <text>John Doe</text>
            </paragraph>
            <paragraph>
                    <image name="johnDoe.png" />
            </paragraph>
            <paragraph>
                    <table>
                            <row>
                                    <tableData>Height</tableData>
                                    <tableData>5'7"</tableData>
                            </row>
                            <row>
                                    <tableData>Contact Information</tableData>
                                    <tableData>Phone Number: (123) 111 - 1111</tableData>
                            </row>
                            <row>
                                    <tableData>Associates</tableData>
                                    <tableData>Jane Doe, Bob Doe, Jerry Dole</tableData>
                            </row>
                    </table>
            </paragraph>

</document>
```

FIG. 3D

TEMPLATE SYSTEM FOR CUSTOM DOCUMENT GENERATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37. CFR 1.57.

This application claims benefit of U.S. Provisional Patent Application Ser. No. 61/909,949. filed Nov. 27, 2013, which is hereby incorporated by reference in its entirety.

Additionally, this application claims benefit of U.S. Provisional Patent Application Ser. No. 61/863,792. entitled "Cable Reader Labeling" filed Aug. 8, 2013, and U.S. Provisional Patent Application Ser. No. 61/863,814. entitled "Cable Reader Snippets and Postboard" filed Aug. 8, 2013, which are hereby incorporated by reference in their entireties and collectively referred to herein as the "Snippet references."

CROSS-REFERENCE TO RELATED APPLICATIONS

This application is related to but does not claim priority from U.S. Pat. No. 8,489,623. entitled "Creating Data In A Data Store Using A Dynamic Ontology" filed May 12, 2011, which is hereby incorporated by reference in its entirety and referred to herein as the "Ontology reference."

BACKGROUND

In the area of computer-based platforms, documents may be programmatically generated from structured data.

SUMMARY

The systems, methods, techniques, and devices described herein each have several aspects, no single one of which is solely responsible for its desirable attributes. Without limiting the scope of this disclosure, several non-limiting features will now be discussed briefly.

In some embodiments, a computer system for generating custom template-based documents comprises a template storage device. The computer system may further comprise one or more hardware processors programmed via executable code instructions. When executed, the executable code instructions may cause the computer system to implement a template generator. The template generator may be configured to access a placeholder template comprising one or more placeholders indicating locations for insertion of executable instructions. The template generator may be further configured to receive executable instructions to be included in the placeholder template. The template generator may be further configured to store, in the template storage device, a template including one or more sets of the received executable instructions inserted into corresponding placeholders of the placeholder template. When further executed, the executable code instructions may cause the computer system to implement a template selection unit. The template selection unit may be configured to receive a selection of the template and selection of one or more data objects to include in a generated custom document based on properties of the one or more data objects. When further executed, the executable code instructions may cause the computer system to implement a template processor. The template processor may be configured to parse the one or more sets of executable instructions included in the template. The template processor may be further configured to execute each set of executable instructions, wherein at least some sets of executable instructions include instructions to access properties of the selected data objects stored in one or more data sources. The template processor may be further configured to generate an output for each set of executable instructions. The template processor may be further configured to generate the custom document by replacing sets of executable instructions in the template with the output generated by execution of corresponding sets of executable instructions. At least some of the output include properties of the selected data objects and/or summary data regarding the properties of the selected data objects.

In some embodiments, a method for generating custom template-based documents may comprise receiving selection of a template, the template including one or more sets of executable instructions. The method may further comprise receiving selection of one or more data objects to access in response to executing the one or more sets of executable instructions. The method may further comprise executing, by a computer system having one or more computer processors and an electronic storage device, each set of executable instructions, wherein at least some sets of executable instructions include instructions to access properties of at least some of the selected data objects. The method may further comprise generating an output for each set of executable instructions. The method may further comprise generating a custom document by replacing sets of executable instructions in the template with the corresponding generated output, including properties of the selected data objects and/or summary data regarding the properties of the selected data objects.

In some embodiments, a non-transitory computer storage comprises instructions for causing a computer system to generate custom template-based documents. When executed, the instructions may receive a template that was modified by replacing placeholders with sets of executable instructions. When executed, the instructions may receive a selection of the template. When executed, the instructions may receive selection of one or more data objects to include in a generated custom document based on properties of the one or more data objects. When executed, the instructions may parse the one or more sets of executable instructions from the template by the computer system. When executed, the instructions may execute each set of executable instructions, wherein at least some sets of executable instructions include instructions to access properties of the selected data objects stored from one or more data sources. When executed, the instructions may generate an output for each set of executable instructions. When executed, the instructions may generate a custom document by replacing sets of executable instructions in the template with the corresponding generated output, including properties of the selected data objects and/or summary data regarding the properties of the selected data objects.

BRIEF DESCRIPTION OF THE DRAWINGS

Certain aspects of the disclosure will become more readily appreciated as those aspects become better understood by reference to the following detailed description, when taken in conjunction with the accompanying drawings.

FIG. 3B illustrates an example Extensible Markup Language document of the placeholder template, according to some embodiments of the present disclosure.

FIG. 3C illustrates an example Extensible Markup Language document of a template with executable code instructions, according to some embodiments of the present disclosure.

FIG. 3D illustrates an example Extensible Markup Language document of an output document following the execution of embedded code instructions, according to some embodiments of the present disclosure.

DETAILED DESCRIPTION

Reports and/or documents may be programmatically generated from structured data. For example, a computer system may be programmed with code instructions to uniformly generate reports and/or documents from structured data. To modify the format of a report and/or document, a new software release may be required to make changes to the report and/or document. In another example, a report and/or document may be generated from the embedded features of a document processing application. Microsoft Word may have built in functions for executing code instructions in a document such as macros for executing Visual Basic.

In addition to computer systems programmed to generate uniform reports and/or the embedded features of a document processing application, disclosed herein are systems, methods, techniques, and devices for dynamically generating custom documents that include information related to one or more data objects and/or properties of those data objects. Using the techniques and systems described herein, efficient, flexible, scalable, and custom document generation may be achieved. In one particular example implementation of the systems and methods discussed herein, custom documents may be generated based on properties of one or more user-selected data objects and based on Microsoft Word templates that include embedded executable code instructions that may be evaluated outside of Microsoft Word. While certain examples herein refer to Microsoft Word, the systems and methods are applicable to any data format and any reading and/or editing software.

Example Template Generation

Figure 1:
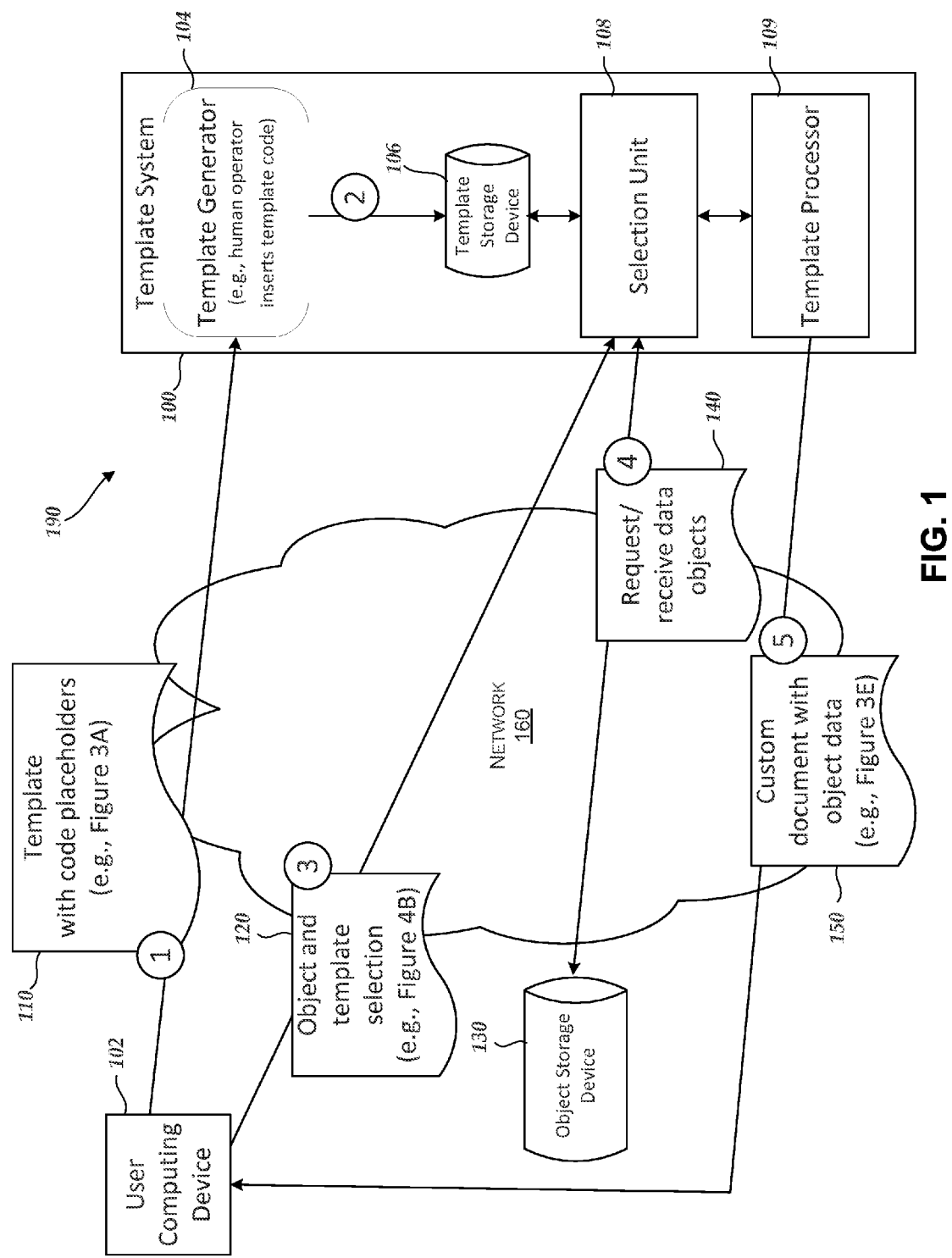
FIG. 1 is a block diagram illustrating an example template system, according to some embodiments of the present disclosure.

FIG. 1 illustrates a template system, according to some embodiments of the present disclosure. In the example embodiment of FIG. 1, the template environment 190 comprises a network 160, a template system 100, a user computing device 102, and an object storage device 130. Various communications between these devices are illustrated. For example, communication of a placeholder template 110, data selection 120, object data 140, and a custom document 150 are illustrated in various actions 1-5 that are illustrated in the circled numbers in the Figure. In this embodiment, the template system 100 includes a template generator 104, a template storage device 106, a selection unit 108, and a template processor 109, each of which is described in further detail below.

Figure 3A:
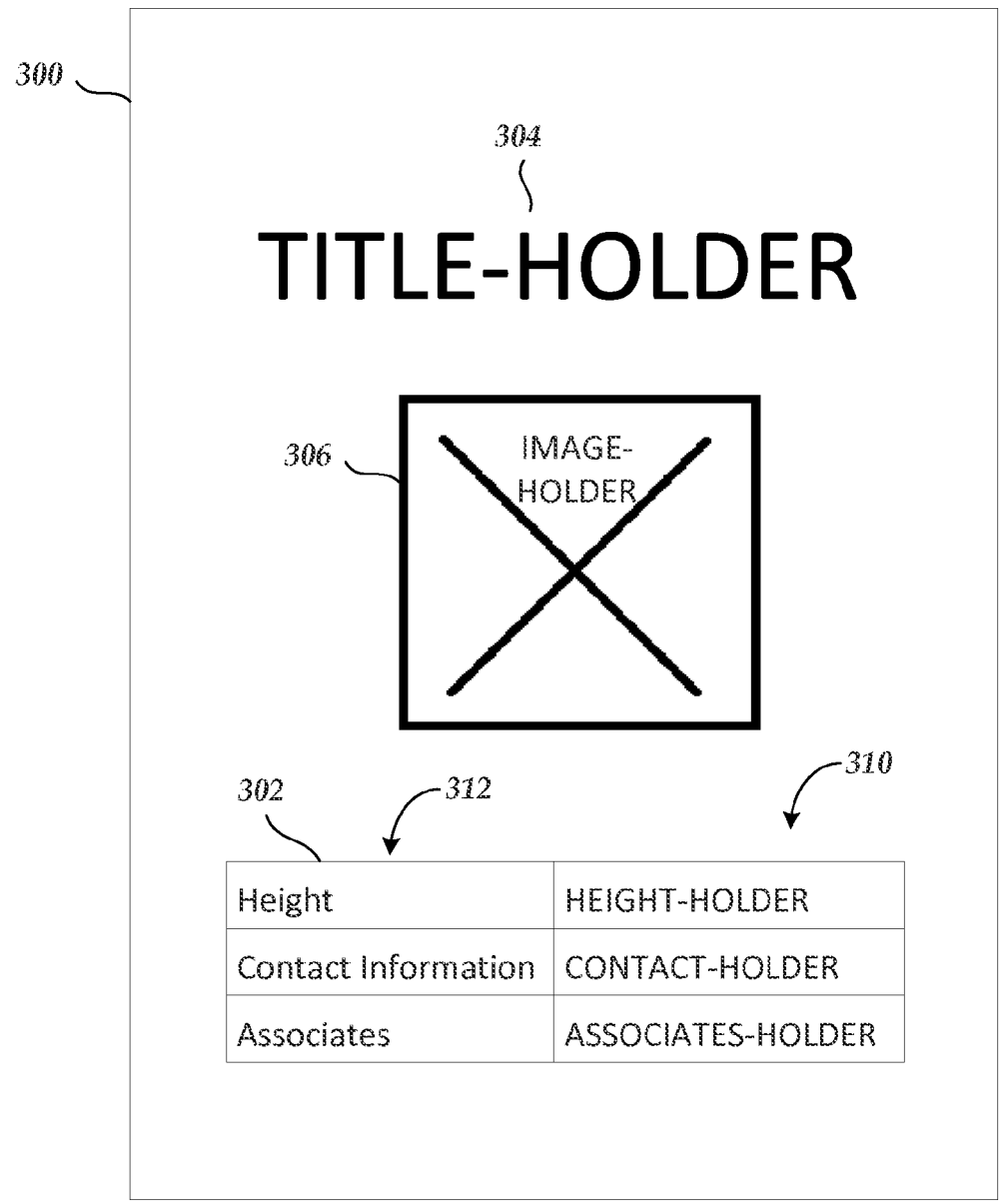
FIG. 3A illustrates an example placeholder template, according to some embodiments of the present disclosure.

As shown in FIG. 1, at action one, a template with code placeholders, which is referred to herein as a "placeholder template," is transmitted from the user computing device 102 to the template generator 104 of the template system 100. In some embodiments, the placeholder template 110 includes code placeholders, which indicate locations in a template document where the user would like content to be added dynamically based on the properties of one or more selected data objects. FIG. 3A, for example, illustrates an example placeholder template 300, with placeholders that have been added and/or displayed through a document processing application. The placeholder template 300 may correspond to the placeholder template 110 of FIG. 1. A human operator may have created the placeholder template 300 in a document processing application, such as, but not limited to, Microsoft Word. The placeholder template 300 may comprise static text and/or features that may be used in all of the reports and/or documents generated from templates based on the placeholder template 300, such as static text 312. In other examples, the header or footer of the document may contain the same information on all reports, such as a company logo.

The human operator may have created the placeholder template 300 to meet specifications for a custom report. The layout may be customized to the specifications of the report and/or to the preferences of the human operator. For example, the title 304 and/or the table 302, may be aligned, formatted, and/or in a font that matches the human operator's preferences. Similarly, the image 306 may be positioned and/or aligned according to the human operator's preferences.

Elements of the placeholder template 300, such as the title 304, the image 306, and/or the table 302 may comprise placeholder elements. The placeholder elements represent aspects and/or features of the document that the human operator desires to be dynamically populated and/or updated with properties from data objects and/or based on the properties of data objects. For example, title-holder 304 may be a placeholder that is to be replaced with a title associated with an object selected by the requester of a document based on the template. For example, the title-holder 304 may be replaced with the name of a person, which may correspond to one or more name properties associated with a person data object. Similarly, the other placeholder elements, such as the image 306 and the height-holder, contact-holder, and associates-holder in table 302 should correspond to properties of one or more objects (e.g., person objects) selected by the requesting human operator.

A template may be in various formats. For example, a template may comprise documents and/or formats such as, but not limited to, Microsoft Word, Microsoft PowerPoint, Microsoft Excel, HyperText Markup Language ("HTML"), a database format, Extensible Markup Language ("XML"), JSON, delimited file formats, a file format that is proprietary to the template system 100, and/or any other format. FIG. 3B illustrates, for example, an XML document of a placeholder template in an XML based document format. For example, the Microsoft Office document formats, such as, but not limited to, Microsoft Word, PowerPoint, Excel, any other document format, may comprise XML based document formats. In other words, for example, a Word document may be an archive file, corresponding to, but not limited to, a ZIP format, of XML documents. As such, a human operator, with the use of an archival application, or some other application, may open a document file archive to view and/or edit the one or more XML documents comprising the document.

The example XML document 310A may correspond to the placeholder template 300 of FIG. 3A, which may be in a document archive format comprising one or more XML files, including the XML document 301A. The example tags in the XML document 310A are illustrative and may not correspond to a specific document XML format.

As illustrated by the XML document 310A, a human operator, upon opening the XML document 310A with a text editing application, XML editing application, and/or some other application, may identify the placeholder elements. For example, "<text>NAME-HOLDER</text>" may be identifiable because of the "HOLDER" text. Thus, a human operator may search through one or more documents 310 that comprise the template (e.g., there may be multiple XML and/or other document types that are part of a single Microsoft Word document) for the particular character string used in the template to identify placeholders. In the example of FIG. 3, the human operator can search for the character string "HOLDER" to easily identify files and/or locations in the files where placeholders are present and where executable code should be inserted in order to make those placeholders operable to obtain data associated with one or more objects. Thus, the use of placeholders may be useful because the various files that make-up a single output format (e.g., Microsoft Word document) may be very large, complex, and/or otherwise difficult to navigate in order to identify the appropriate locations to replace placeholders with executable code. For example, a single XML document may be thousands of lines with hundreds of different tags. Thus, identifying portions of the XML document may be achieved by searching for placeholders in the XML document. Furthermore, a human operator may edit and/or modify the XML document without fully understanding a complex XML based document format because the placeholders may focus the human operator on the important sections of the XML for editing and/or modifying.

While XML is shown in the document 310A, the template system may support other previously mentioned document formats and/or any other document format. For example, a HTML template may be used, and the placeholders may be placed in a HTML document.

Returning to FIG. 1, at action two, the template generator 104 generates a template by replacing the placeholders in the placeholder template 110 (or placeholder template 300 of FIG. 3A) with code segments that are executable in order to obtain replacement data for those placeholders. In some embodiments, some or all of the embedded code instructions associated with placeholders may be placed and/or included in the placeholder template 110 that is sent from the user computing device 102 to the template generator 104 through the network 160. For example, the user 102 may write the code segments based on using a programming interface provided by the template generator 104, which may be implemented on the user computing device 102 partially and/or fully in various embodiments. Thus, the template generator 104 may be configured to receive executable instructions to be included in a document template, either by the user 102 and/or by another user that may have more programming skills that are useful in writing and/or selecting code associated with each placeholder. For example, the template generator 104 may be a text editing application operated by a human operator that inserts the embedded code instructions based on the code placeholders. In some embodiments, the template generator 104 may be an automated process that receives the template 110 with code placeholders and automatically replaces the code instruction placeholders with embedded instructions. In some embodiments, template generation is automatic, manual, or some combination thereof. The template generator 104 may output and/or store the generated template with embedded code instructions in the template storage device 106.

FIG. 3C illustrates the template with executable code instructions inserted, which may be distinguished from the placeholder template (e.g., FIG. 3B). The XML document 310A of FIG. 3B may have been modified to produce the coded XML document 310B. The executable code instructions in the coded XML document 310 are illustrative and, thus, may not correspond to any specific programming language or include instructions that are syntactically complete and/or correct. The template system may be configured to support one or more interpreted programming languages, such as, but not limited to, embedded Ruby, JRuby, Groovy, BASIC, Perl, Python, Jython, and/or LISP. The template system may also be configured to support other programming languages, such as, but not limited to, Java, Lua, C, C++, and/or C#.

The use of embedded code instructions in the coded XML document 310B may allow for dynamic document creation based on data objects. For example, the code instruction, "<% print(object.getName) %>," may cause the template system 100 of FIG. 1 (and/or the template processor 109 discussed further below) to retrieve the name property of a selected object (or objects) and print that name property to the document. As previously mentioned, the human operator and/or a template generator may know where to insert the particular code instruction within that XML element because of the "NAME-HOLDER" indicator from the XML document 310A in FIG. 3B. Similarly, the human operator and/or template generator may add embedded code instructions accessing data object properties based on the placeholders in the template corresponding to the image 306, and/or the table 302 of FIG. 3A.

In some embodiments, there may be some variations of how the embedded code instructions are executed. For example, to execute interpreted programming languages, such as, but not limited to, Ruby and/or Groovy, the template system 100 of FIG. 1 (and/or the template processor 109 discussed further below) may execute the embedded code instructions at runtime without compiling the embedded code instructions. In some embodiments, to execute compiled or partially compiled programming languages, such as, but not limited to, Java and/or C++, the template system 100 of FIG. 1 (and/or the template processor 109 discussed further below) may comprise a compiler unit that compiles the extracted code instructions to be able to execute those code instructions.

In some embodiments, the template generator 104 and/or template system 100 of FIG. 1 may comprise tools and/or applications for editing XML based document formats and/or other document formats. For example, an XML based document formatting application may allow a human operator to open an XML based document format and edit the XML files of the XML based document format directly. As previously illustrated, an XML based document format may comprise a file archive of XML documents. Thus, without an XML based document formatting application and/or tool, a human operator may have to open the XML based document file archive before editing the XML files and/or re-archive the XML files after making the XML changes. An XML based document formatting application and/or tool may allow the human operator to easily open, edit, and/or save XML documents within an XML based document format by performing the archiving and/or re-archiving steps automatically.

The use of embedded code instructions in the document 310B may allow for custom programming logic for document generation. For example, the code instruction 312, "if object-.getPhoneNumber is not null," includes an if-statement. Therefore, the following code instruction 314, "println (Phone Number: +object.getPhoneNumber)," may only be executed if the if-statement 312 evaluates to the boolean True. Thus, programming logic in the document 310B may allow for conditional logic based on data object properties. The code instruction block 316 may illustrate further programming logic. For example, a person object may have multiple records associated with the person, each record may have a height property, and, therefore, a person may have multiple height properties. However, it may be desirable to display the most common height of a person. Therefore, the code instruction "height=frequencyMap(records, 'height').getMostCommon" at 316 may determine the most common height property that may be printed to the document.

The use of embedded code instructions in the document 310B may allow for efficient custom document creation. For example, the first and last illustrated code instructions, respectively, "<% for each object in objects %>" and "<% end %>," which may be illustrative of a for loop, may cause the template processor 109, when executing the code, to perform operations within the loop for each of the one or more data objects. The use of a for loop may be efficient because the two lines of embedded code instructions will cause the template system to loop over any number of objects and repeat the static text and/or executable code instructions within the for loop. For example, the for loop may enclose the respective elements corresponding to the title 304, image 306, and/or the table 302 of FIG. 3A. Therefore, upon executing the embedded code instructions within template, a page and/or section will be generated per data object (each corresponding to one loop of the for loop). For example, if ten person objects were selected, determined, accessed, and/or loaded and sent to the template system, ten pages and/or sections each corresponding to one person object may be generated.

Example Selection and Execution of a Template

Returning to FIG. 1, actions 1-2 describe operations that may be performed in generating a coded template. Once a coded template is generated and stored in the template storage device 106, that coded template can be selected by the human operator and/or any other users for use in creating a document based on the template. Actions 3-5 of FIG. 1 illustrate example processes that may be performed by a user in selecting a template, selecting one or more objects from which information is to be used in the document generated based on the template, and generating that document based on the object properties.

Figure 4A:
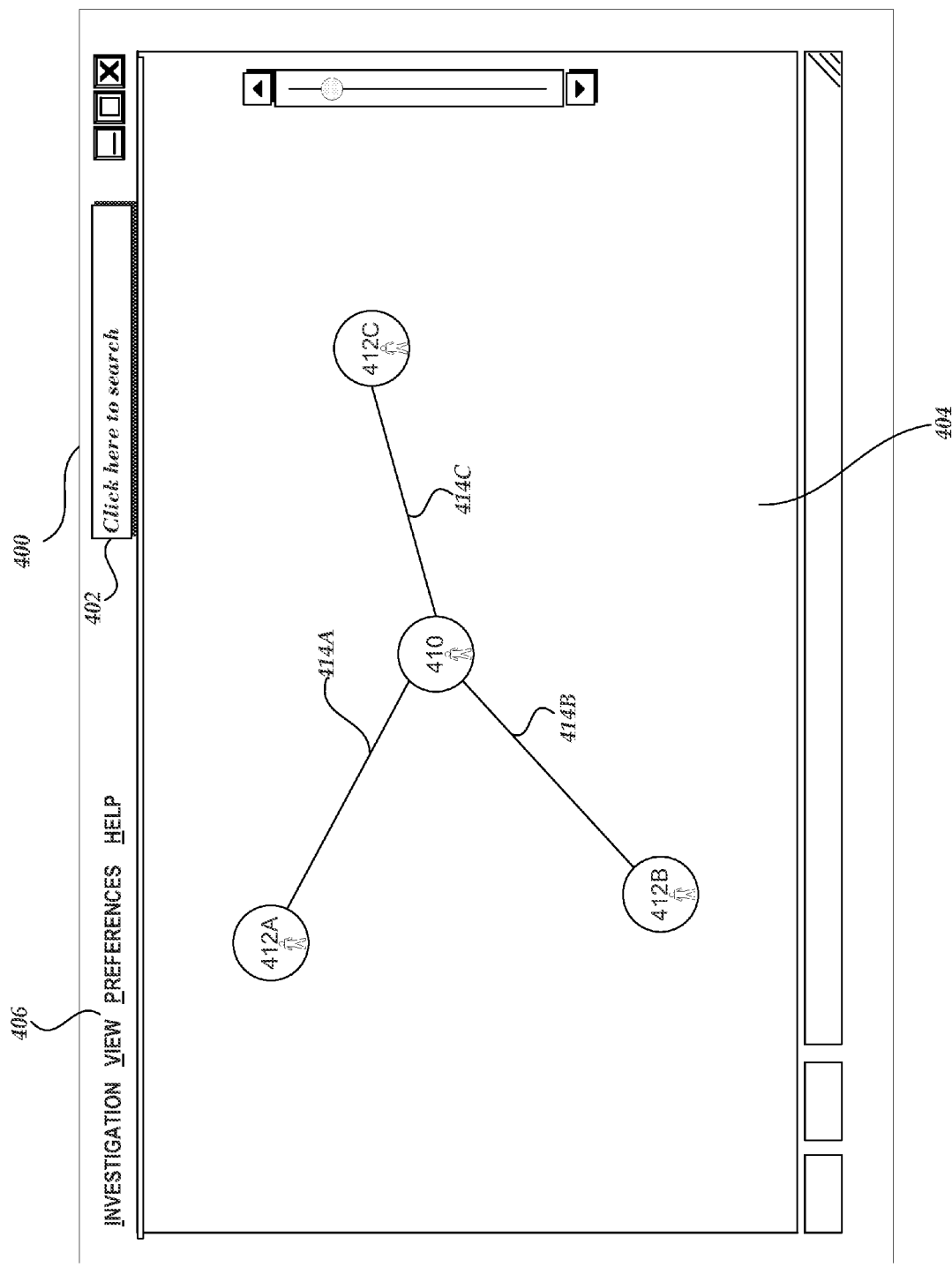
FIG. 4A illustrates an example user interface of the template system for loading and/or viewing data objects, according to some embodiments of the present disclosure.

In action 3, the user of the user computing device 102 selects one or more objects to be included in the document/report. For example, if the user is a law enforcement officer and once a report including information on each of 10 suspects, those 10 suspects may be selected. Referring to FIG. 4A, for example, a user interface 400 of a software application configured to provide data regarding objects and to allow the user to select one or more of the data objects. The example user interface 400 comprises a search box 402, an object display area 404, and menu bar 406. A human operator, e.g., the user of the user computing device 102, by typing and/or entering data into the search box 402 may load, lookup, and/or retrieve one or more data objects. For example, by typing the name of a person, such as "John Doe," the person object 410 may be displayed in the object display area 404.

The other person objects 412 (including objects 412A, 412B, and/or 412C) may be displayed automatically and/or after user interaction by the human operator with the person object 410. For example, a human operator may select the person object 410 and select an option to display associates and/or persons related to the person object 410. The links 414A, 414B, and/or 414C may display relationships between the person object 410 and related person objects 412A, 412B, and/or 412C, respectively. For example, the person objects 412 may be related to the person object 410, such as, but not limited to, associates, acquaintances, and/or family members. The user interface 400 may be capable of displaying any type of data object and/or may not be limited to displaying person data objects.

In some embodiments, the embedded code instructions may determine one or more additional data objects based on the one or more selected objects. For example, known associate objects and/or the arrest record objects for a selected person object may be determined programmatically from the embedded code instructions, such as by using techniques discussed in U.S. patent application Ser. No. 13/968,265, and U.S. patent application Ser. No. 13/968,123, which are hereby incorporated by reference in their entireties. For example, the selected person data object may be a starting point to determine one or more additional related data objects. For example, a stolen vehicle report object, which has color property of "red," may be selected by the human operator, and the embedded code instructions of a template may identify data objects associated with pictures of red cars observed speeding nearby the location of the stolen vehicle (e.g., as indicated in object properties of those data objects).

In some embodiments, the embedded code instructions may access data from other servers and/or web sites, either internally and/or externally from the template system. For example, a Google Street View image may be access and/or loaded by the embedded code instructions. The Google Street View image may be associated with the location property of a data object. Other data may be accessed and/or loaded through the execution of code instructions by the template system 100 of FIG. 1 (and/or the template processor 109 discussed further below), such as, but not limited to, currency exchange rates, weather data, new reports, and/or any other available information.

In addition to visually searching and/or showing data objects and/or relationships between data objects, the user interface 400 may allow various other manipulations. For example, data objects may be inspected (e.g., by viewing properties and/or associated data of the data objects), filtered (e.g., narrowing the universe of objects into sets and subsets by properties or relationships), and statistically aggregated (e.g., numerically summarized based on summarization criteria), among other operations and visualizations.

Figure 4B:
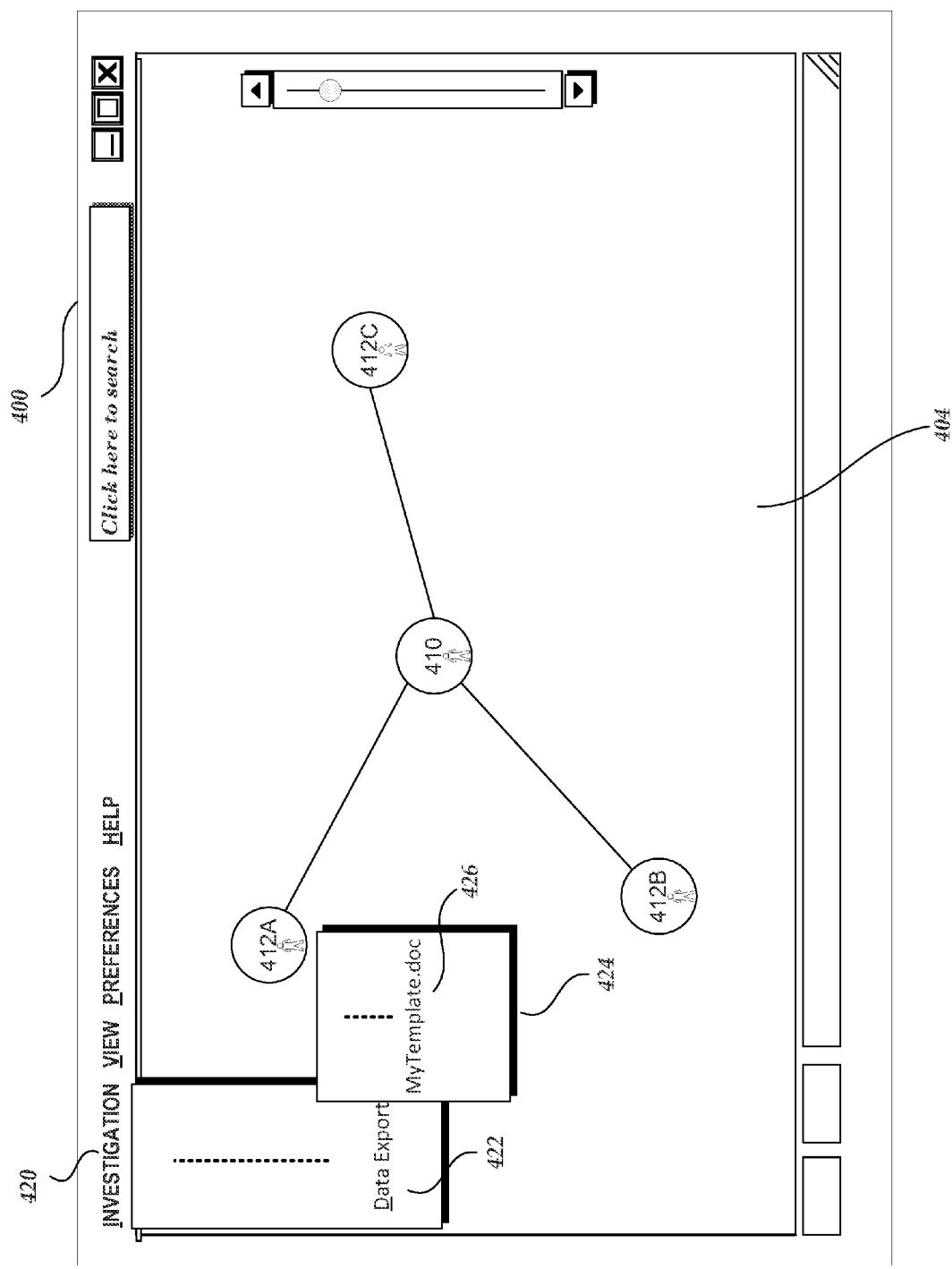
FIG. 4B illustrates an example user interface of the template system for selecting a template, according to some embodiments of the present disclosure.

When a user has the appropriate objects selected for use in the generated document, the user may then select one or more of several available templates to be used in generating a document including properties of the selected objects. For example, FIG. 4B illustrates the user interface 400 of FIG. 4A, with a particular template selected for use in generating a document based on the selected objects (all of the objects displayed in this embodiment). In this example, the human operator has selected the template "MyTemplate" 426 by accessing an "INVESTIGATION" menu 420 selected, selecting the "Data Export" menu item 422, and then choosing the template 426 from a list 424 of any templates available to the user. In some embodiments, by selecting a particular template (e.g., "MyTemplate" 426), the process of generating a custom document based on all of the data objects displayed in the objects in the display area 404 is initiated. In some embodiments, the template user interface 400 may allow the human operator to individually and/or in a group select data objects, whether or not those objects remain viewable in the display area 404. Thus, upon selecting the template menu item 426 a custom document may be generated from the selected data objects.

In some embodiments, the template system may have an interface that accepts the transmission and/or upload templates such that the templates may be present in the menu list 424. For example, after the creation and/or generation of a template with embedded code instructions, which may correspond to an XML based document format comprising the XML document 310B in FIG. 3C, a human operator may then upload the template to the template system. The menu list 424 of the user interface may then be automatically populated with the latest list of available templates.

Returning to FIG. 1, once the template and objects to be included in the generated document are selected, indications of those selections are transmitted to the template system 100 for use by the selection unit 108 in obtaining properties of the selected objects for use in the generated document and accessing the selected template. For example, the data selections 120 may be sent from the user computing device 102 to the selection unit 108 through the network 160. As noted above, the data selection 120 may comprise one or more data object selections and/or template selections. The selection unit 108 may load and/or retrieve the template from the template storage device 106 based on the data selection 120. The selection unit 108 may request, receive, and/or load information and/or data regarding the data objects identified in the selection 120 from the object storage device 130. The selection unit 108 may send the template and/or the data objects to the template processor 109.

In action 5, the template processor 109 generates the custom document 150 based on the template with embedded executable instructions and the data objects 140 (and/or properties of data objects) accessed at the object storage device 130. The custom document 150 with properties from the data objects outputted from the template processor 109 may be sent to the user computing device 120 through the network 160. Thus, the template processor 109 is configured to identify executable code in the template, access properties of the selected, determined, and/or loaded objects based on the executable code, and replace the executable code with the output of the particular executable code segment. FIG. 3D illustrates the example XML document of FIG. 3C with the embedded code instructions replaced with information regarding selected data objects. The output XML document 320 may be configured for interpretation by viewing software, such as a word processor (e.g., Microsoft Word), a browser, and/or other software, in order to depict a custom document that includes the object data.

In this example, the element "<text>John Doe</text>" illustrates that what was originally the TITLE-HOLDER of the placeholder template has been replaced with the name property value of a person object that was accessed based on execution of the executable code "<%=print(object.getName) %>" in the template. Similarly, an image name corresponding to the John Doe person object is included in the output document XML 320 in place of the Image placeholder. The other HOLDER elements of the table 302 have also been replaced with properties of the selected object, in response to execution of the corresponding code segments that replaced the placeholders by the template processor 109.

While the output document XML 320 illustrates output from executing embedded instructions from a single person data object, the ellipsis 322 illustrates that multiple person data objects may have been accessed and corresponding embedded code instructions may have been executed. As a result, the ellipsis 322 may comprise multiple sections and/or pages of the output document that may correspond to multiple person data objects. For example, if the object selection 120 includes the four person objects identified in FIG. 4A, the output document XML 320 may include separate sections (e.g., corresponding to separate sections of a document, pages of the document, or separate documents) for each of the selected objects.

Figure 2:
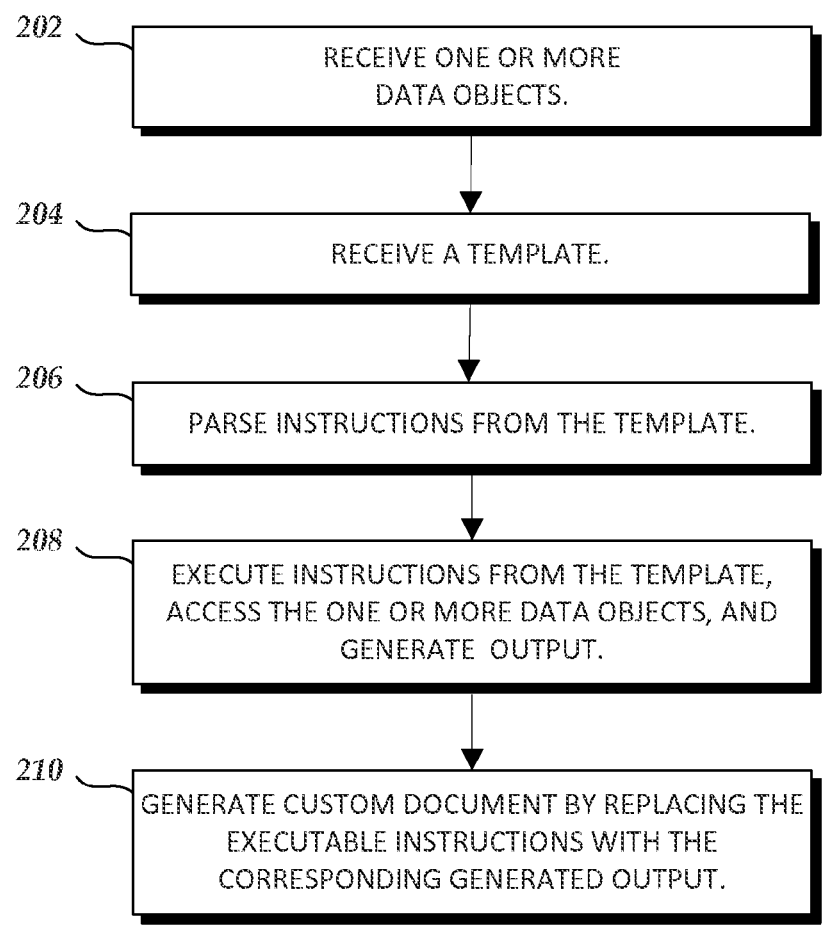
FIG. 2 is a flowchart illustrating an example document generation process from a template, according to some embodiments of the present disclosure.
Figure 3E:
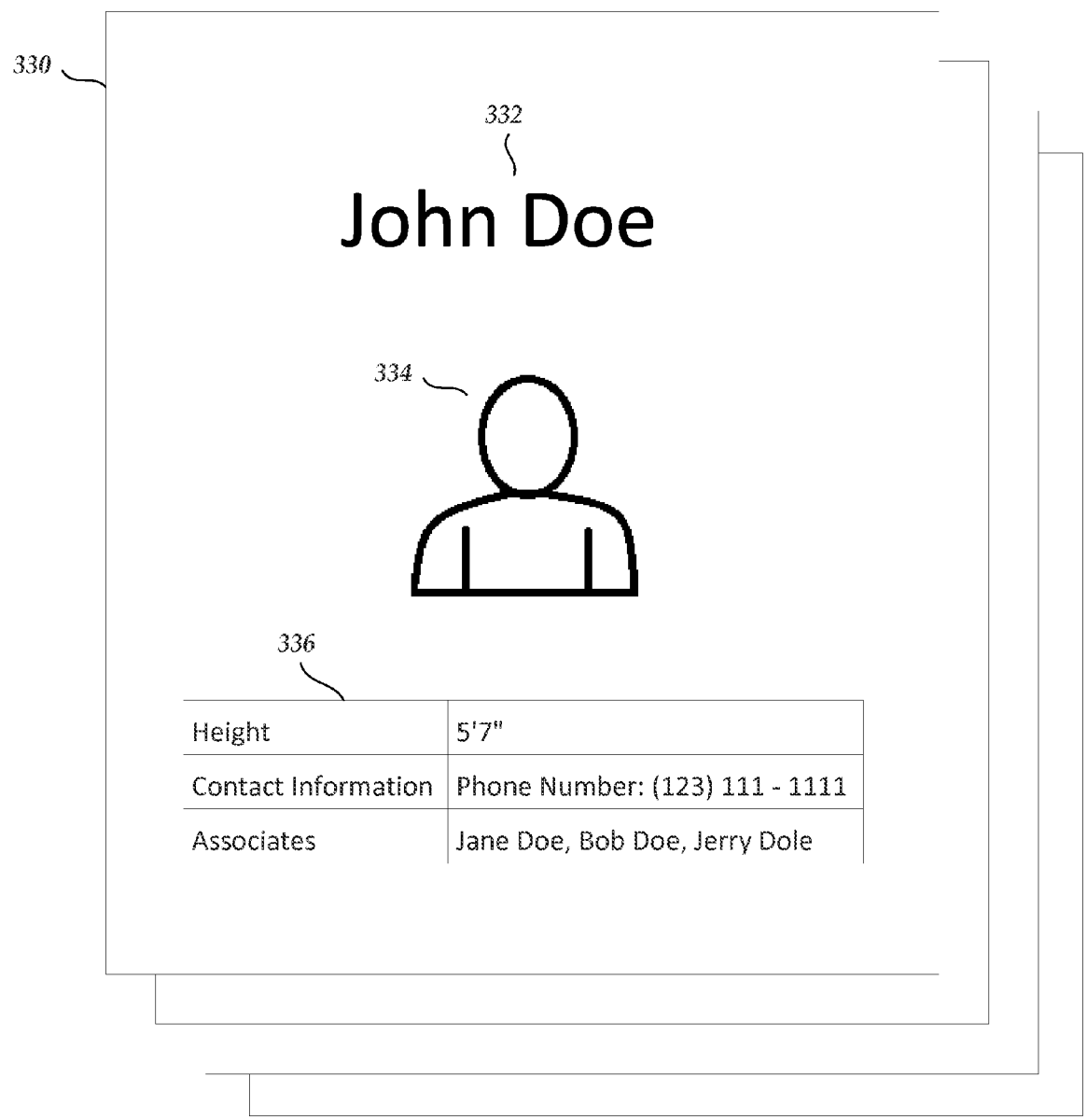
FIG. 3E illustrates an example custom document, according to some embodiments of the present disclosure.

FIG. 3E illustrates an example custom document that may be returned to a user, such as the custom document 150 of FIG. 1. In one embodiment, the custom document 330 is generated by the template processor 109, which is discussed further with reference to block 210 of FIG. 2. The example custom document 330 illustrates how an output custom document may be perceived by a human operator viewing the custom document 330 in a document processing application (e.g., the user of the user computing device 102 viewing the document in a word processor). For example, the title 332, image 334, and/or the table 336 correspond to the XML elements of the custom document XML 320 of FIG. 3D. As illustrated, the custom document 330 comprises multiple pages, which may correspond to multiple person objects being processed by the template system, such as the four example objects selected in the user interface of FIG. 4A.

The template system may efficiently output the custom document 330 because it may be based on a template. For example, the template system may execute and/or replace the embedded code instructions of the template document as shown by the modified XML document 310B. Thus, the template system may reuse all of the static text and/or everything but the embedded instructions of the template document to generate the custom document. Furthermore, the template system may be agnostic as to the specific details of a particular document format, such as, but not limited to, Microsoft Word. Similar to a template that may comprise a XML based document format, the custom document 330 may also comprise an XML based document format. Thus, the custom document 330 may comprise the custom document XML 320 of FIG. 3D.

The template system may output the custom document 330 populated with properties from data objects and/or matching the document format, editing, layout, etc. matching the template document 300 from FIG. 3A the human operator may have originally created.

In some embodiments, the user computing device 102, the template system 100, and the object storage device 130 may be on the same computing device or multiple computing devices. In some embodiments, communication between the user computing device 102, the template system 100, and object storage device 130 may occur without the use of the network 160. For example, if the user computing device 102, the template system 100, and object storage device 130 were on the same computing device, communication may occur without the use of a network.

Data Objects

In some embodiments, data is conceptually structured according to an object data model represented by an ontology. The conceptual data model may be independent of any particular and/or specific type of data store. For example, each object of the conceptual data model may correspond to one or more rows in a relational database and/or an object in an in-memory cache.

In some embodiments, an ontology, as noted above, may include stored information providing a data model for storage of data in a data store. The ontology may be defined by one or more object types, which may each be associated with one or more property types. At the highest level of abstraction, a data object is a container for information representing things in the physical world. For example, a data object may represent an entity such as a person, a place, an organization, a market instrument, and/or some other noun. Data objects may represent an event that happens at a point in time and/or for a duration. Data objects may represent a document and/or other unstructured data source such as an e-mail message, a news report, a written paper, and/or a written article. Each data object may be associated with a unique identifier that uniquely identifies the data object within the data store.

Different types of data objects may have different property types. For example, a "Person" data object might have an "Eye Color" property type and an "Event" data object might have a "Date" property type. Each property as represented by data in the data store may have a property type defined by the ontology used by the data store.

Objects may be instantiated in the data store in accordance with the corresponding object definition for the particular object in the ontology. For example, a specific monetary payment (e.g., an object of type "event") of US$30.00. (e.g., a property of type "currency") taking place on Mar. 27, 2009. (e.g., a property of type "date") may be stored in the data store as an event object with associated currency and date properties as defined within the ontology.

The data objects defined in the ontology may support property multiplicity. For example, a data object may be allowed to have more than one property of the same property type. For example, a "Person" data object might have multiple "Address" properties or multiple "Name" properties.

In some embodiments, the data objects the template system receives may correspond to an ontology according to the systems, methods, and/or techniques disclosed in the Ontology reference.

Example Document Generation Process

FIG. 2 is a flowchart illustrating a document generation process from a template, according to some embodiments of the present disclosure. The method of FIG. 2 may be performed by the template system 100 of FIG. 1, such as the various components of FIG. 1 that are discussed above, including the template processor 109. Depending on the embodiment, the method of FIG. 2 may include fewer or additional blocks and/or the blocks may be performed in order different than is illustrated.

Beginning at block 202, properties of one or more data objects are accessed. For example, a person object, including some or all of the properties of that person object, may be received by the template system 100. The person object may possess one or more properties, such as, one or more, names, addresses, and other data.

At block 204, a template is received and/or accessed. The template may correspond to one or more of the previously illustrated formats. For example, the template may be a Word Document.

At block 206, executable code instructions are parsed from the template. One or more escape characters may be used to indicate an executable code instruction block in the template. For example, the "<%" and "%>" characters may respectively indicate the beginning and end of an executable code instruction block and/or a set of executable code instructions. Other escape characters and/or tags may be used to indicate executable code instructions in a template. The executable code instructions may correspond to one or more programming languages.

At block 208, the executable code instructions from the template are executed. Data objects and/or properties of the data objects may be accessed by the executable code instructions. The executable code instructions may also contain programming logic. For example, executable code instructions may access a person object, check for properties such as residences, and/or only print the most recent resident address.

At block 210, a custom document is generated. The custom document may include properties of the received data objects and/or summary data regarding the properties of the received data objects. The document may correspond to the same format and/or type as the format and/or type of the template. For example, if the template was a Word Document, the document may also be a Word Document. The document may be generated by replacing the executable code instructions in the template with the corresponding generated output. The actual template document may not be modified. For example, a copy of the template document may be made, and the executable code instructions in the copy template may be replaced.

Making Changes to a Complete Template

A human operator may desire, want, and/or need to modify the look, design, formatting, and/or layout of a complete template after the embedded instructions have been added to the template. For example, the human operator may modify the original placeholder template, which did not contain any of the embedded code instructions, in a word processing application, such as, but not limited to, Microsoft Word. The human operator, or an automated process and/or tool, may then copy the embedded instructions from the existing template to the new placeholder template. As a result, a new template with the design, formatting, and/or layout changes in the updated document format, but still including the proper embedded code instructions, is created. Thus, a human operator may make the necessary changes in the word processing application, which may alleviate the need for the human operator to understand and/or have to make changes to a complex document format, such as, but not limited to, an XML based document format.

Example User Interfaces

Figure 4C:
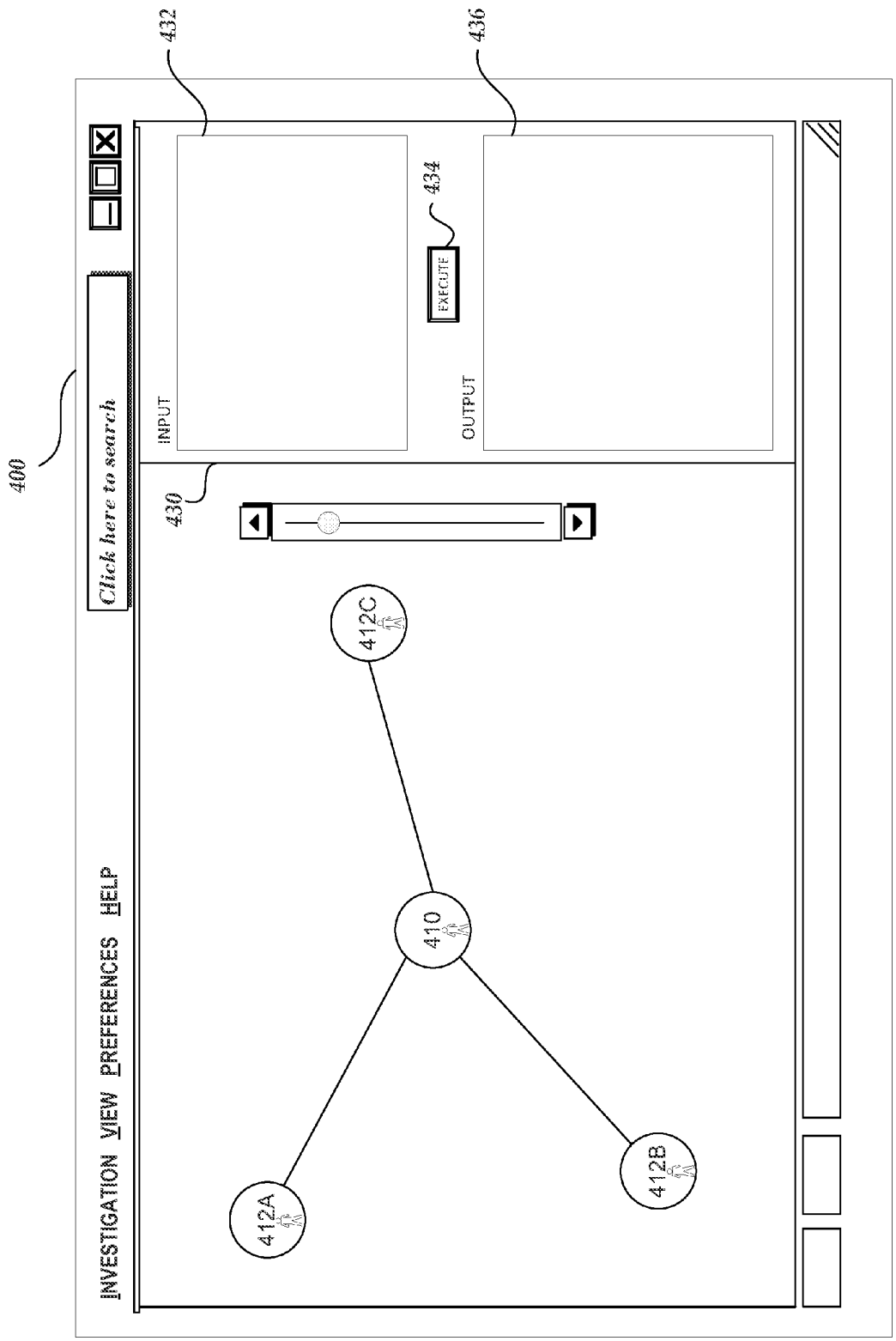
FIG. 4C illustrates an example user interface of the template system for evaluating code instructions, according to some embodiments of the present disclosure.

FIGS. 4A, 4B, and 4C illustrate example user interfaces of the template system, or a subset thereof, according to some embodiments of the present disclosure. In some embodiments, the user interfaces described above and below may be displayed in any suitable computer system and/or application, for example, in a web browser window and/or a standalone software application, among others. Additionally, the functionality and/or user interfaces of the system as shown in FIGS. 4A, 4B, and/or 4C may be implemented in one or more computer processors and/or computing devices, as is described with reference to FIG. 5. As noted above, in some embodiments the user interface 400 may be used for the object and data selection 120 illustrated in FIG. 1. In some embodiments, upon selecting a specific template menu item 426, a custom document including object data associated with the selected objects, is generated. As noted above, FIG. 4A illustrate the user interface 400 displaying several objects 410, 412, and associations 414 between the objects. Depending on the software application (e.g., Palantir's Gotham software), objects may be selected in various manners. Also as discussed above, FIG. 4B illustrates example menu options that may be used to select a particular template to be used in generating an output document including information regarding the selected objects.

Moving to FIG. 4C, the example user interface 400 comprises an evaluation tool 430, which includes an input box 432, an execute button 434, and/or an output box 436. A human operator may use the evaluation tool 430 to evaluate and/or test executable code instructions to view their sample print output before embedding those and/or similar instructions in a template.

An example use case and/or scenario for the evaluation tool 430 may be the following. As previously illustrated, a human operator may load and/or retrieve data objects 410 and/or 412, and then select none, one, some, or all of the data objects. A human operator may then type and/or insert code instructions into the input box 432. For example, some or all of the code instructions from FIG. 3C and/or any other code instructions may be entered into the input box 432. A human operator may then click, tap, and/or touch the execute button 432, which may cause the template system to execute the code instructions in the input box 432. In some embodiments, after the template system executes the code instructions, the output box may be automatically populated with the output of the executed code instructions. For example, if the code instructions in the input box 432 were "<%=print(object.getName) %>," the output box 436 might display "John Doe," which may correspond to the name property of a selected data object. In some embodiments, the template processor 109 of FIG. 1 may execute the code instructions from the input box 432.

In some embodiments, a human operator may use the evaluation tool 430 to generate a template document efficiently. For example, a human operator may test, experiment, and/or preview code instructions by seeing what the output of those code instructions might look like before embedding those instructions in a template. The evaluation tool 430 may allow the human operator to fix issues and/or problems with the code instructions before uploading a template into the template system. Without the evaluation tool 430, a human operator would need to generate a template, upload it to the template system, and then execute the template on data objects to see what the output of those code instructions would look like. Thus, the evaluation tool 430 may save the human operator time and/or reduce the time it takes to generate a template.

Snippets

In some embodiments, the template system may be used to insert snippets into a custom document according to the systems, methods, and/or techniques disclosed in the Snippet references. For example, the embedded code instructions of a template may be evaluated in order to import into the document data related to snippet objects, such as importing the text portion of the returned snippets into the report body, and/or the citation portion of the snippet into a footnote. In this way, each snippet may be automatically added to the report (and future reports based on the same template) automatically without human intervention.

Implementation Mechanisms

The various computing device(s) discussed herein, such as the template system 100 of FIG. 1, are generally controlled and coordinated by operating system software, such as, but not limited to, iOS, Android, Chrome OS, Windows XP, Windows Vista, Windows 7, Windows 8, Windows Server, Windows CE, Unix, Linux, SunOS, Solaris, Macintosh OS X, VxWorks, or other compatible operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things. The template system 100 may be hosted and/or executed on one or more computing devices with one or more hardware processors and with any of the previously mentioned operating system software.

Figure 5:
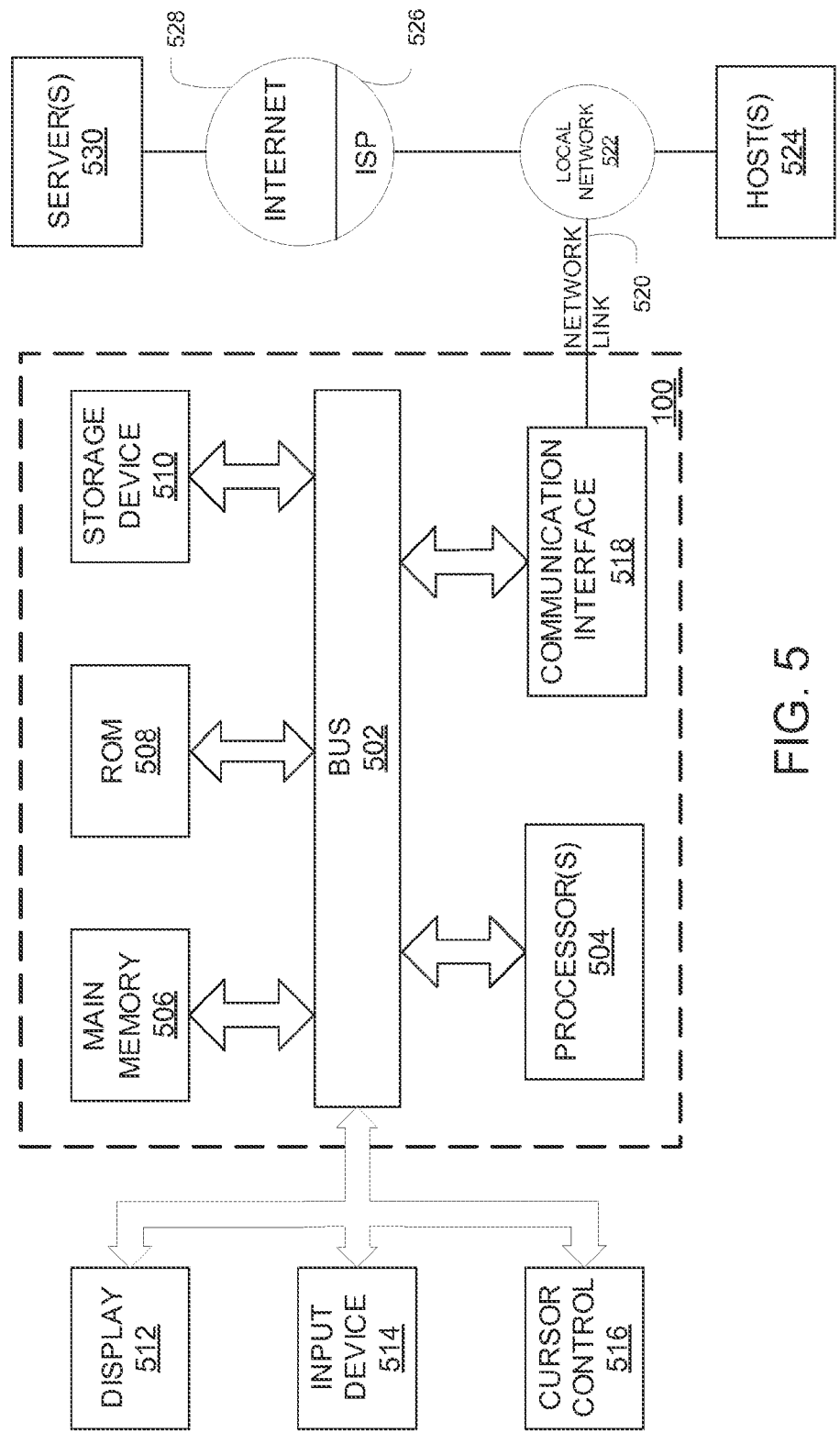
FIG. 5 is a block diagram illustrating an example template system with which various methods and systems discussed herein may be implemented.

FIG. 5 is a block diagram that illustrates example components of the template system 100. While FIG. 5 refers to the template system 100, any of the other computing devices discussed herein may have some or all of the same or similar components.

The template system 100 may execute software, e.g., standalone software applications, applications within browsers, network applications, etc., whether by the particular application, the operating system, or otherwise. Any of the systems discussed herein may be performed by the template system 100 and/or a similar computing system having some or all of the components discussed with reference to FIG. 5.

The template system 100 includes a bus 502 or other communication mechanism for communicating information, and a hardware processor, or multiple processors, 504 coupled with bus 502 for processing information. Hardware processor(s) 504 may be, for example, one or more general purpose microprocessors.

The template system 100 also includes a main memory 506, such as a random access memory (RAM), cache and/or other dynamic storage devices, coupled to bus 502 for storing information and instructions to be executed by processor(s) 504. Main memory 506 also may be used for storing temporary variables or other intermediate information during execution of instructions to be executed by processor(s) 504. Such instructions, when stored in storage media accessible to processor(s) 504, render the template system 100 into a special-purpose machine that is customized to perform the operations specified in the instructions. Such instructions, as executed by hardware processors, may implement the methods and systems described herein for sharing security information.

The template system 100 further includes a read only memory (ROM) 508 or other static storage device coupled to bus 502 for storing static information and instructions for processor(s) 504. A storage device 510, such as a magnetic disk, optical disk, or USB thumb drive (Flash drive), etc., is provided and coupled to bus 502 for storing information and instructions. The template storage device 106 and/or the object storage device 130 of FIG. 1 may be stored on the main memory 506 and/or the storage device 510.

In some embodiments, the template storage device 106 and/or the object storage device 130 of FIG. 1 is a file system, relational database such as, but not limited to, MySql, Oracle, Sybase, or DB2, and/or a distributed in memory caching system such as, but not limited to, Memcache, Memcached, or Java Caching System.

The template system 100 may be coupled via bus 502 to a display 512, such as a cathode ray tube (CRT) or LCD display or touch screen, for displaying information to a computer user. An input device 514 is coupled to bus 502 for communicating information and command selections to processor 504. One type of input device 514 is a keyboard including alphanumeric and other keys. Another type of input device 514 is a touch screen. Another type of user input device is cursor control 516, such as a mouse, a trackball, a touch screen, or cursor direction keys for communicating direction information and command selections to processor 504 and for controlling cursor movement on display 512. This input device may have two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The template system 100 may include a user interface unit to implement a GUI, for example, FIGS. 4A, 4B, and/or 4C, which may be stored in a mass storage device as executable software codes that are executed by the computing device(s). This and other units may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "instructions," as used herein, refers to logic embodied in hardware or firmware, or to a collection of software units, possibly having entry and exit points, written in a programming language, such as, but not limited to, Java, Lua, C, C++, or C#. A software unit may be compiled and linked into an executable program, installed in a dynamic link library, or may be written in an interpreted programming language such as, but not limited to, BASIC, Perl, or Python. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Generally, the instructions described herein refer to logical modules that may be combined with other modules or divided into sub-modules despite their physical organization or storage.

The template system 100, or components of it, such as selection unit 108 and/or template processor 109 of FIG. 1, may be programmed, via executable code instructions, in a programming language.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor(s) 504 for execution. For example, the instructions may initially be carried on a magnetic disk or solid state drive of a remote computer. The remote computer may load the instructions into its dynamic memory and send the instructions over a telephone or cable line using a modem. A modem local to the template system 100 may receive the data on the telephone or cable line and use an infra-red transmitter to convert the data to an infra-red signal. An infra-red detector can receive the data carried in the infra-red signal and appropriate circuitry can place the data on bus 502. Bus 502 carries the data to main memory 506, from which the processor(s) 504 retrieves and executes the instructions. The instructions received by main memory 506 may retrieve and execute the instructions. The instructions received by main memory 506 may optionally be stored on storage device 510 either before or after execution by processor(s) 504.

The template system 100 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to be communicated with a WAN). Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from the template system 100, are example forms of transmission media.

A network, such as the network 160 of FIG. 1, may comprise, but is not limited to, one or more local area networks, wide area network, wireless local area network, wireless wide area network, the Internet, or any combination thereof The template system 100 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor(s) 504 as it is received, and/or stored in storage device 510, or other non-volatile storage for later execution.

Each of the processes, methods, and algorithms described in the preceding sections may be embodied in, and fully or partially automated by, code instructions executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing units, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof

What is claimed is:

1. A computer system for generating custom template-based documents, the computer system comprising:
a template storage device; and
one or more hardware processors programmed, via executable code instructions, to implement:
a template generator configured to:
access a placeholder template comprising one or more placeholders indicating locations for insertion of executable instructions;
receive executable instructions to be included in the placeholder template; and
store, in the template storage device, a template including one or more sets of the received executable instructions inserted into corresponding placeholders of the placeholder template;
a user interface unit configured to:
generate one or more user interfaces configured to display one or more selectable graphics each corresponding to one or more respective data objects; and
receive, via the one or more user interfaces, selection of one or more data objects to include in a custom document based at least in part on a selection of the one or more selectable graphics by a user, at least one of the selected one or more data objects comprising a person data object;
a template selection unit configured to receive a selection of the template; and
a template processor configured to:
parse the one or more sets of executable instructions included in the template;
execute each of the one or more sets of executable instructions, wherein at least one set of first executable instructions includes instructions to access properties of the selected data objects stored in one or more data sources, and wherein at least one of the accessed properties is associated with the person data object, and wherein at least one set of second executable instructions is configured to determine an additional data object and at least one property associated with the additional data object based on at least one property of the selected one or more data objects;
generate an output for each of the one or more sets of executable instructions; and
generate the custom document by replacing the one or more sets of executable instructions in the template with the output generated by execution of corresponding sets of executable instructions, at least some of the output including properties of the selected one or more data objects, the at least one property associated with the person data object, and the at least one property associated with the additional data object.

2. The system of claim 1, wherein the template comprises an XML based document format.

3. The system of claim 2, further comprising:
an XML document editor, wherein the XML document editor is configured to receive user input to modify the XML documents of an XML based document.

4. The system of claim 1, wherein the custom document comprises a law enforcement document.

5. The system of claim 1, wherein the placeholder template comprises:
a name placeholder;
an image placeholder;
a contact information placeholder; and
an address placeholder.

6. The system of claim 5, wherein the placeholder template further comprises:
an alias placeholder;
an associates placeholder; and
a prior arrests placeholder.

7. The system of claim 1, wherein the template processor comprises:
a code interface configured to parse code in multiple programming languages.

8. The system of claim 7, wherein the code interface is configured for Groovy.

9. The system of claim 1, wherein at least one set of third executable instructions is configured to access a snippet object, the snippet object comprising at least one citation data property, and wherein the custom document includes the at least one citation data property.

10. The system of claim 1, wherein the template generator is further configured to:
access a second placeholder template comprising second data, wherein the second data corresponds to at least one of a graphic or text, and wherein the second data is not present in the placeholder template;
store, in the template storage device, a second template including the one or more sets of the received executable instructions; and
generate a second custom document based on the second template, the second custom document comprising the second data.

11. The system of claim 1, wherein the one or more user interfaces are configured to:
receive a second set of executable code instructions from an interactive command line, wherein at least some of the second set of executable code instructions are configured to cause the system to access properties of the selected one or more data objects when executed; and
display output of the second set of executable code instructions.

12. A method for generating custom template-based documents, the method comprising:
receiving selection of a template, the template including one or more sets of executable instructions;
generating one or more user interfaces configured to display one or more selectable graphics each corresponding to one or more respective data objects;
receiving, via the one or more user interfaces, selection of one or more of the data objects via a user selection of one or more selectable graphics associated with the selected one or more data objects, at least one of the selected one or more data objects comprising a person data object, wherein the selected one or more data objects are accessed in response to executing the one or more sets of executable instructions;
executing, by a computer system having one or more computer processors and an electronic storage device, each of the one or more sets of executable instructions, wherein at least one set of first executable instructions includes instructions to access properties of at least some of the selected one or more data objects, and wherein at least one of the accessed properties is associated with the person data object, and wherein at least one set of second executable instructions is configured to determine an additional data object and at least one property associated with the additional data object based on at least one property of the selected one or more data objects;
generating an output for each of the one or more sets of executable instructions; and
generating a custom document by replacing the one or more sets of executable instructions in the template with the corresponding generated output, including properties of the selected one or more data objects, the at least one property associated with the person data object, and the least one property associated with the additional data object.

13. The method of claim 12, wherein the template comprises an XML based document format.

14. The method of claim 13, further comprising:
providing an XML editing user interface, wherein the XML editing user interface is configured to receive user input to modify XML elements of an XML based document;
receiving first user input of static text in a placeholder template, the static text to be included in the custom document;
receiving second user input of a placeholder character string at a particular location of the placeholder template;
providing an XML view of the placeholder template, the XML view including elements usable by a word processor to generate a depiction of the placeholder template;
providing, via the XML editing user interface, identifiers to locate the placeholder character string in the XML view;
receiving, via the XML editing user interface, a first set of executable instructions replacing the placeholder character string in the XML view; and
storing, as the template, the placeholder template with the first set of executable instructions replacing the placeholder character string.

15. The method of claim 12, further comprising:
accessing a second template including the one or more sets of the executable instructions and second data, wherein the second data corresponds to at least one of a graphic or text, and wherein the second data is not present in the template; and
generating a second custom document based on the second template, the second custom document comprising the second data.

16. The method of claim 12, wherein the custom document comprises a rap sheet including criminal history information regarding an individual.

17. Non-transitory computer storage comprising instructions for causing a computer system to generate custom template-based documents by:
receiving a template that was modified by replacing placeholders with sets of executable instructions;
receiving a selection of the template;
generating one or more user interfaces configured to display one or more selectable graphics each corresponding to one or more respective data objects;
receiving, via the one or more user interfaces, selection of one or more data objects to include in a custom document based on properties of the one or more data objects based at least in part on a selection of the one or more selectable graphics by a user, at least one of the selected one or more data objects comprising a person data object;
parsing the one or more sets of executable instructions from the template by the computer system;
executing each of the one or more sets of executable instructions, wherein at least one set of executable instructions includes instructions to access properties of the selected one or more data objects stored from one or more data sources, and wherein at least one of the accessed properties is associated with the person data object, and wherein at least one set of second executable instructions is configured to determine an additional data object based on an association between the additional data object and at least one of the selected one or more data objects;

generating an output for each of the one or more sets of executable instructions; and generating a custom document by replacing the one or more sets of executable instructions in the template with the corresponding generated output, including the at least one property associated with the person data object, and at least one property associated with the additional data object.

18. The non-transitory computer storage of claim 17, wherein the template comprises an XML based document format.

19. The non-transitory computer storage of claim 17, wherein the custom document comprises a law enforcement document.

20. The non-transitory computer storage of claim 17, wherein at least one set of executable instructions is configured to determine an additional data object based on at least one property of the selected one or more data objects, and wherein the custom document includes output corresponding to at least one property of the additional data object.

* * * * *